US012256465B2

(12) United States Patent
Cho et al.

(10) Patent No.: US 12,256,465 B2
(45) Date of Patent: Mar. 18, 2025

(54) METHOD OF SETTING UP NETWORK LOCK FUNCTION OF ELECTRONIC DEVICE AND ELECTRONIC DEVICE USING THE SAME

(71) Applicant: Samsung Electronics Co., Ltd., Gyeonggi-do (KR)

(72) Inventors: Donghyun Cho, Gyeonggi-do (KR); Hanjae Jeong, Gyeonggi-do (KR); Hyunchool Chung, Gyeonggi-do (KR); Seungjoo Na, Gyeonggi-do (KR); Youcheol Moon, Gyeonggi-do (KR); Junwoo Park, Gyeonggi-do (KR); Jisun Lee, Gyeonggi-do (KR); Sangyoung Ju, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 17/841,826

(22) Filed: Jun. 16, 2022

(65) Prior Publication Data

US 2023/0018495 A1  Jan. 19, 2023

Related U.S. Application Data

(63) Continuation of application No. PCT/KR2022/006807, filed on May 12, 2022.

(30) Foreign Application Priority Data

Jul. 19, 2021 (KR) .......................... 10-2021-0094516

(51) Int. Cl.
*H04W 88/02* (2009.01)
*H04W 8/18* (2009.01)
(Continued)

(52) U.S. Cl.
CPC ............. *H04W 8/183* (2013.01); *H04W 8/24* (2013.01); *H04W 12/71* (2021.01); *H04W 12/72* (2021.01)

(58) Field of Classification Search
CPC ..... H04W 8/183; H04W 12/72; H04W 12/71; H04W 8/24
See application file for complete search history.

(56) References Cited

U.S. PATENT DOCUMENTS 9,191,815 B2  11/2015 Yao et al.
9,363,362 B2  6/2016 Chuang
(Continued)

FOREIGN PATENT DOCUMENTS

CN  104270741 A  1/2015
EP  2480042 B1  1/2018
(Continued)

OTHER PUBLICATIONS

IP.com (Year: 2024).*
(Continued)

*Primary Examiner* — Moustapha Diaby
(74) *Attorney, Agent, or Firm* — Cha & Reiter, LLC

(57) ABSTRACT

An electronic device according to an embodiment of the disclosure may include a communication module, a subscriber identification module, and at least one processor. The at least one processor may identify identification information of the subscriber identification module stored in the subscriber identification module when the subscriber identification module is identified as being first inserted, may configure a network service provider based on the identified identification information, may generate a signature by using lock information of the subscriber identification module, may identify network lock information when the signature is identified as being valid, and may set up a network (Continued)

lock function of the communication module based on the identified network lock information.

16 Claims, 16 Drawing Sheets

(51) Int. Cl.
*H04W 8/24* (2009.01)
*H04W 12/06* (2021.01)
*H04W 12/71* (2021.01)
*H04W 12/72* (2021.01)

(56) References Cited

U.S. PATENT DOCUMENTS

| | | | |
|---|---|---|---|
| 10,932,126 B2 | 2/2021 | Xie et al. | |
| 2009/0061934 A1 | 3/2009 | Hauck et al. | |
| 2011/0081950 A1* | 4/2011 | Guven | H04W 8/22 |
| | | | 455/558 |
| 2012/0190334 A1 | 7/2012 | Li | |
| 2012/0220269 A1* | 8/2012 | Feng | H04L 63/0853 |
| | | | 455/411 |
| 2014/0025964 A1 | 1/2014 | Hui et al. | |
| 2014/0115697 A1* | 4/2014 | Wang | H04W 12/08 |
| | | | 726/19 |
| 2015/0133104 A1* | 5/2015 | Lim | H04W 8/183 |
| | | | 455/418 |
| 2016/0037344 A1* | 2/2016 | Kim | H04W 12/48 |
| | | | 455/411 |
| 2018/0014179 A1* | 1/2018 | Chan | H04M 17/103 |
| 2018/0367989 A1 | 12/2018 | Zhu et al. | |
| 2020/0314635 A1 | 10/2020 | Park et al. | |
| 2023/0147815 A1* | 5/2023 | Cho | H04L 63/123 |
| | | | 713/168 |

FOREIGN PATENT DOCUMENTS

| | | |
|---|---|---|
| EP | 3 410 756 B1 | 12/2019 |
| EP | 2693789 B1 | 12/2019 |
| KR | 10-2020-0114392 A | 10/2020 |
| WO | 2012/126239 A1 | 9/2012 |
| WO | 2018/010480 A1 | 1/2018 |
| WO | 2020/171466 A1 | 8/2020 |

OTHER PUBLICATIONS

ProQuest (Year: 2024).*
International Search Report dated Jul. 22, 2022.
Extended European Search Report dated Sep. 2, 2024.
3rd Generation Partnership Project; Technical Specification Group Services and System Aspects; . . .

* cited by examiner

METHOD OF SETTING UP NETWORK LOCK FUNCTION OF ELECTRONIC DEVICE AND ELECTRONIC DEVICE USING THE SAME

CROSS-REFERENCE TO RELATED APPLICATION(S)

This application is a continuation of and based on and claims priority under 35 U.S.C. § 120 to PCT International Application No. PCT/KR2022/006807, which was filed on May 12, 2022, and claims priority to Korean Patent Application No. 10-2021-0094516, filed on Jul. 19, 2021, in the Korean Intellectual Property Office, the disclosure of which are incorporated by reference herein their entirety.

BACKGROUND

Technical Field

One or more embodiments of the instant disclosure generally relate to a method of setting up the network lock function of an electronic device and the electronic device using the same and, more particularly, to a method of setting up the network lock function of an electronic device where a network service provider is configured by using a piece of software in the electronic device and the electronic device using the same.

Description of Related Art

An electronic device (e.g., a mobile communication device) may be assigned with a device identification number (e.g., an international mobile equipment identity (IMEI) or a mobile equipment identifier (MEID)) for identifying the electronic device.

For example, the IMEI is a 15-digit number that identifies the device manufacturer, the model name, and the serial number, and is a unique number of a mobile communication device. The IMEI may be used for various purposes. For example, when first attempting communication with the electronic device, a base station may identify whether the electronic device is an authorized device by using the IMEI, and may block communication if the electronic device is not authorized.

A network service provider may determine whether an electronic device is electronic device (e.g., an electronic device that has subscribed to the network service provider) to be supported by using an identification number of the electronic device.

SUMMARY

One electronic device has different requirements for its various network service provider. In the process of configuring the networks, the electronic device may be released into the market after corresponding information (e.g., corresponding software) is stored in the electronic device for each network service provider by the manufacturer of the electronic device. For example, in the network configuration process, software of a specific network service provider may be installed, and the electronic device may be released after information on the network service provider is also stored in the electronic device.

Furthermore, the electronic device may be released into the market after a permission lock, such as a subscriber identity module (SIM) lock or a network lock, is configured.

In this case, the network lock is also called a factory lock, and may refer to when networks other than a specific network are restricted from being used before the electronic device is released. If an electronic device is released after the network lock is set up, there is a difficulty in setting up the electronic device to be connected to another network service provider.

In order to solve such a difficulty, there is a need for a method of configuring a network lock when an electronic device is released into the market in the state in which a network service provider has not been configured.

An electronic device according to an embodiment of the disclosure may include a communication module, a subscriber identification module, and at least one processor. The at least one processor may identify whether the subscriber identification module is first inserted, may identify identification information of the subscriber identification module stored in the subscriber identification module when the subscriber identification module is identified as being first inserted, may configure a network service provider based on the identified identification information, may generate a signature by using lock information of the subscriber identification module, may identify whether the signature is valid, may identify network lock information when the signature is identified as being valid, and may configure a network lock function of the communication module based on the identified network lock information.

An electronic device according to an embodiment of the disclosure may include a communication module, a subscriber identification module, and at least one processor. The at least one processor may identify whether the subscriber identification module is first inserted, may identify identification information of the subscriber identification module stored in the subscriber identification module when the subscriber identification module is identified as being first inserted, may transmit, to a server, the identification information of the subscriber identification module and identification information of the electronic device, may receive network service provider information, a signature, and network lock information from the server, may identify whether the signature is valid, may identify the network lock information when the signature is identified as being valid, and may configure a network lock function of the communication module based on the identified network lock information.

An operating method of an electronic device according to an embodiment of the disclosure may include identifying whether a subscriber identification module is first inserted, identifying identification information of the subscriber identification module stored in the subscriber identification module when the subscriber identification module is identified as being first inserted, configuring a network service provider based on the identified information, generating a signature by using lock information of the subscriber identification module, identifying whether the signature is valid, identifying network lock information when the signature is identified as being valid, and setting up a network lock function based on the identified network lock information.

An operating method of an electronic device according to an embodiment of the disclosure may include identifying whether a subscriber identification module is first inserted, identifying identification information of the subscriber identification module stored in the subscriber identification module when the subscriber identification module is identified as being first inserted, transmitting the identification information of the subscriber identification module and identification information of the electronic device to a server, receiving network service provider information, a signature, and network lock information from the server, identifying whether the signature is valid, identifying the network lock information when the signature is identified as being valid, and configuring a network lock function of the communication module based on the identified network lock information.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
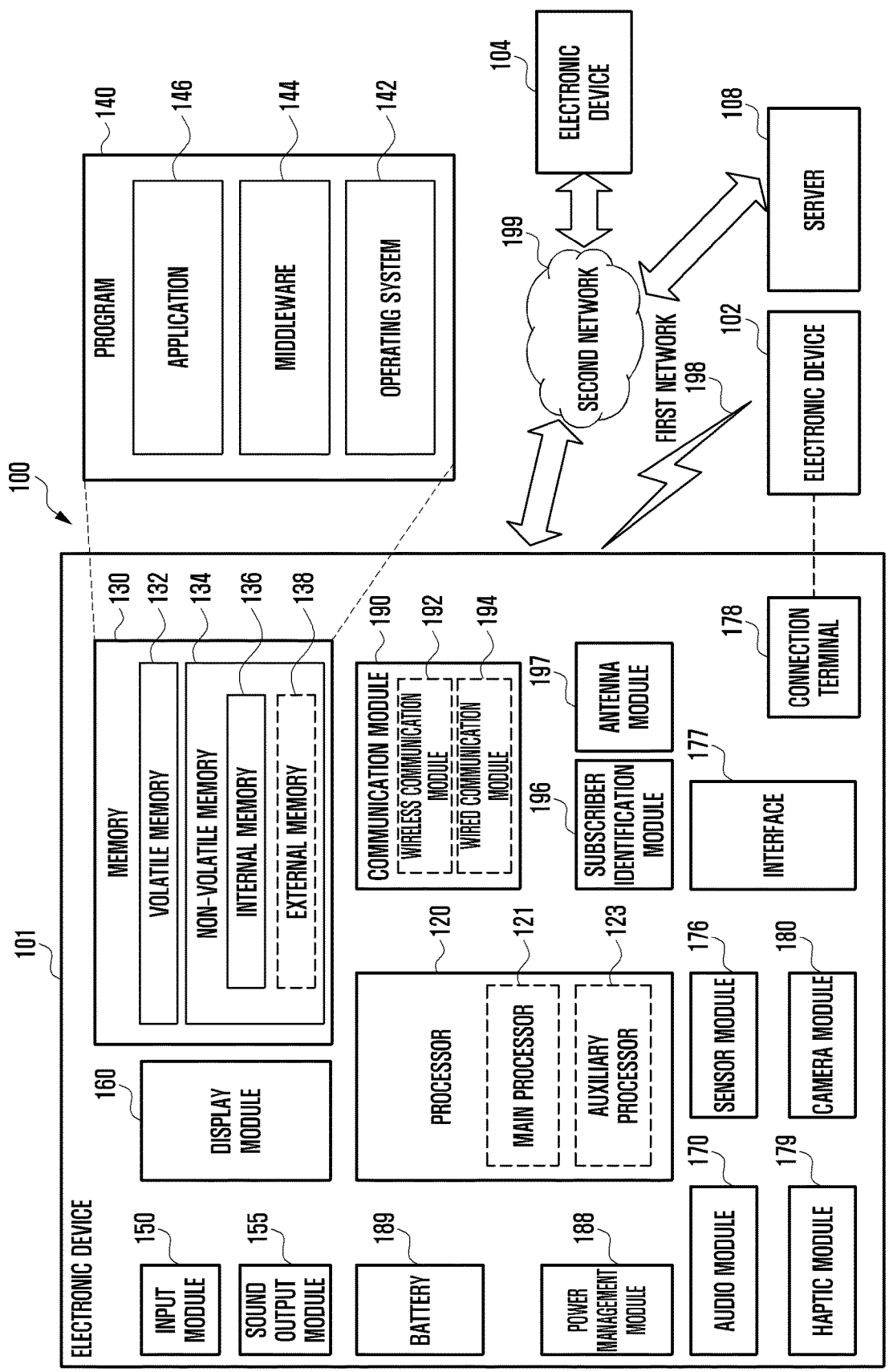
FIG. 1 is a block diagram of an electronic device within a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
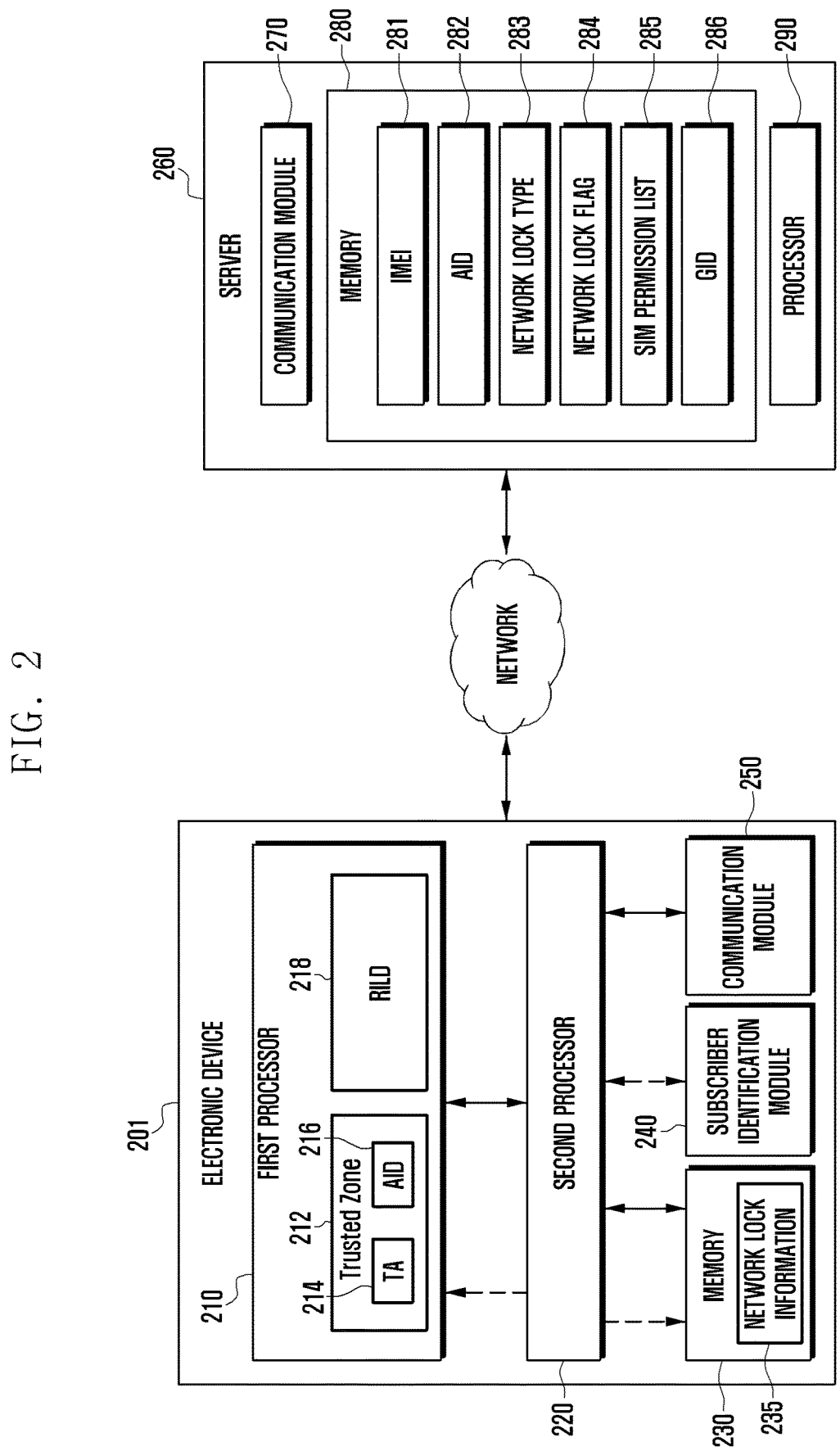
FIG. 2 is a block diagram of a system including an electronic device and a server according to an embodiment.

FIG. 2 is a block diagram of a system including an electronic device and a server according to an embodiment.

With reference to FIG. 2, according to an embodiment, an electronic device 201 may include a first processor 210, a second processor 220, a memory 230, a subscriber identification module 240 or a communication module 250. The electronic device 201 may further include some of or all the components of the electronic device 101 illustrated in FIG. 1. In FIG. 2, the first processor 210 and the second processor 220 are described as separate components, but may be implemented by one processor. According to an embodiment, the first processor 210 may be an application processor (e.g., the main processor 121 in FIG. 1), and the second processor 220 may be a communication processor (e.g., the auxiliary processor 123 in FIG. 1). The first processor 210 and/or second processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, the first processor 210 may execute a trusted application (TA) 214. The TA 214 is a trustable application, and may be an application installed upon manufacturing of the electronic device 201. For example, the TA 214 may include an application provided by the manufacturer of the electronic device 201, an application of a network service provider, or an application using a security function (e.g., an application programming interface (API) that accesses a memory region whose security has been reinforced) of the electronic device.

According to an embodiment, the first processor 210 may identify an activated ID (AID) 216. Information of a network service provider may be stored in the AID 216. When the first processor 210 stores (or sets up) information of the network service provider in the AID 216, the electronic device 201 may be configured to correspond to the network service provider. For example, when the electronic device 201 is configured to correspond to the network service provider, the electronic device 201 may access a network (e.g., the second network 199 in FIG. 1) by using a SIM provided by the network service provider and may be provided with communication services from the corresponding network service provider. For example, when the SIM of an available service provider has not been determined (e.g., state in which the SIMs of all service providers are available), specific information (e.g., information indicating that a service provider has not been configured) may be stored or not stored in the AID 216.

According to an embodiment, the TA 214 may be stored in the memory 230 (e.g., a security region of the memory 230), and may be executed by the first processor 210. After a network lock is set up, the AID 216 may also be stored in the memory 230 (e.g., the security region of the memory 230), and may be identified by the first processor 210. The TA 214 and the AID 216 are software and information which are trusted by and available for the electronic device 201, and may be executed or stored in a trusted zone 212 within the first processor 210. According to an embodiment, another trusted zone (not illustrated) may be present within the second processor 220. The TA 214 and the AID 216 may be executed or identified in the trusted zone of the second processor 220. The trusted zone may mean a trusted execution environment or a secure execution environment.

According to an embodiment, the first processor 210 may communicate with the second processor 220 through a radio interface layer demon (RILD) 218. The RILD 218 is an abstract layer, and may process communication of the first processor 210. The RILD 218 may provide an abstracted layer between an application (or service) of the first processor 210 and the second processor 220. According to an embodiment, the first processor 210 may communicate with the second processor 220 in a kernel (not illustrated) region, or may perform communication through a separate logical channel (or physical channel), such as a secure channel (not illustrated) between the first processor and the second processor.

According to an embodiment, the second processor 220 may control the communication module 250 so that the electronic device 201 may perform communication with another electronic device. The second processor 220 may transmit and receive information on the subscriber identification module 240 through communication with the first processor 210.

According to an embodiment, the subscriber identification module 240 may store a subscriber identifier (e.g., an international mobile subscriber identity (IMSI)). According to an embodiment, the subscriber identification module 240 may further store other information such as an international mobile equipment identity (IMEI), a mobile equipment identifier (MEID), an embedded multimedia card identifier (eMMC ID), an embedded SIM (eSIM) ID, an electronic device ID, a communication processor identifier (CP ID), and an application processor identifier (AP ID), but the disclosure is not limited thereto. The subscriber identification module 240 may be implemented in the form of a SIM card or in a form embedded in the electronic device (e.g., embedded SIM (eSIM)), for example.

According to an embodiment, the subscriber identification module 240 may be integrated and implemented within the first processor 210 or the second processor 220. In an embodiment, the subscriber identification module 240 is not separately implemented, and device identification information for the identification and certification of the electronic device 201 may be stored in the first processor 210 or the second processor 220.

According to an embodiment, the electronic device 201 may perform a certification procedure over a network by using a subscriber identifier (e.g., IMSI) stored in the subscriber identification module 240. According to an embodiment, the electronic device 201 may perform the certification procedure over a network by using at least one of mobile equipment identifier (MEID), eMMC ID, eSIM ID, electronic device ID, CP ID, and AP ID.

According to an embodiment, network lock information 235 may be stored in the memory 230. The network lock information 235 may be stored as a file in a file system. According to an embodiment, the network lock information 235 may include at least one of network lock password, network control key (NCK), master control key (MCK), network subset code key (NSCK), service provider control key (SPCK), subscriber identity module (SIM) (SIMCK)/USIM lock, corporate lock key (CPCK) network lock, activation information of a network lock, set-up information for types of network lock or lock of the subscriber identification information, or a permission mobile country code (MCC)/mobile network code (MNC) list of service provider subscriber identification information, or a black MCC/MNC list. The network lock password may include at least one of network control key, service provider (SP) control key, master control key and/or subset control key. The network lock activation information may include information indicating whether a network lock or unlock has been activated. For example, the type of network lock may include at least one of network lock, subset lock, service provider (SP) lock, corporate service provider (CP) lock, Activate lock, auto network lock, auto subset lock, auto SP lock, auto CP lock, auto SIM lock and/or USIM lock. According to an embodiment, the memory 230 may be a common storage device, such as a universal flash storage (UFS) or an embedded multimedia card (eMMC).

According to an embodiment, the communication module 250 may be operatively connected to at least one processor (e.g., the second processor 220), and may receive data from a server 260 and transmit data to the server 260.

According to an embodiment, the server 260 may include a communication module 270, a memory 280, or a processor 290. The server 260 may further include some of or all the components of the electronic device 101 illustrated in FIG. 1.

According to an embodiment, the communication module 270 of the server 260 may transmit and receive data to and from the electronic device 201 over a network. For example, the communication module 270 may receive data transmitted by the electronic device 201 and deliver the data to the processor 290, and may transmit, to the electronic device 201, data processed (or generated) by the processor 290.

According to an embodiment, the processor 290 of the server 260 may transmit and receive data to and from the electronic device 201 by controlling the communication module 270. The processor 290 may identify information stored in the memory 280, if necessary. For example, when the communication module 270 receives, from the electronic device 201, a message to request information about a network service provider and delivers the message to the processor 290, the processor 290 may identify the information in the memory 280 and deliver the information on the network service provider to the communication module 270.

According to an embodiment, at least some of IMEI 281, AID 282, network lock type 283, network lock flag 284, SIM permission list 285, or group ID (GID) 286 may be stored in the memory 280. According to an embodiment, items may be managed in the memory 280 according to the IMEI 281. The items may be managed for each IMEI 281. In this case, the network lock type 283 may be one of temporary network unlock, permanent network unlock, or network lock. The network lock flag 284 may indicate one of network lock or network unlock. The GID 286 is a group ID, and may be information associated with a network service provider for each SIM. According to an embodiment, the memory 280 may further store at least some of international mobile equipment identity (IMEI), mobile equipment identifier (MEID), embedded multimedia card identifier (eMMC ID), embedded SIM (eSIM) ID, electronic device ID, communication processor identifier (CP ID), and application processor identifier (AP ID), but the disclosure is not limited thereto.

According to an embodiment, the address region or physical region of the memory 230 may be divided into a security region and a common region. For example, data operated in a TEE (e.g., the TrustZone 212 or the TA 214) may be at least temporarily stored in the security region. For example, the AID 216 may be stored in the security region of the memory 230 and used by the TEE. In certain embodiments of the disclosure, it is chiefly described that the AID 216 is stored in the security region, but the disclosure is not limited thereto. For example, the AID 216 may also be stored in a common region of the memory 230 or a separate region. In an embodiment, the security region may include a replay protection memory block (RPMB), an one time programmable (OTP) region, or an eFuse.

According to an embodiment, at least some of the AID 282, the network lock type 283, the network lock flag 284, the SIM permission list 285, the GID 286, a temporary network unlock start time, and a temporary network unlock end time corresponding to the IMEI 281 may be further stored in the memory 280. According to an embodiment, the IMEI 281 may be used as a terminal identifier for setting up a network lock function, but in other embodiments the IMEI 281 may be substituted with one of the MEID, the eMMC ID, the Device ID, the AP unique ID, or the CP unique ID.

According to an embodiment, the manufacturer of the electronic device 201 may store, in the server 260, information related to a network corresponding to the electronic device 201 when the electronic device 201 is released into the market. According to an embodiment, the server 260 may be operated by the manufacturer of an electronic device or a network service provider, but the disclosure is not limited thereto.

Figure 3A:
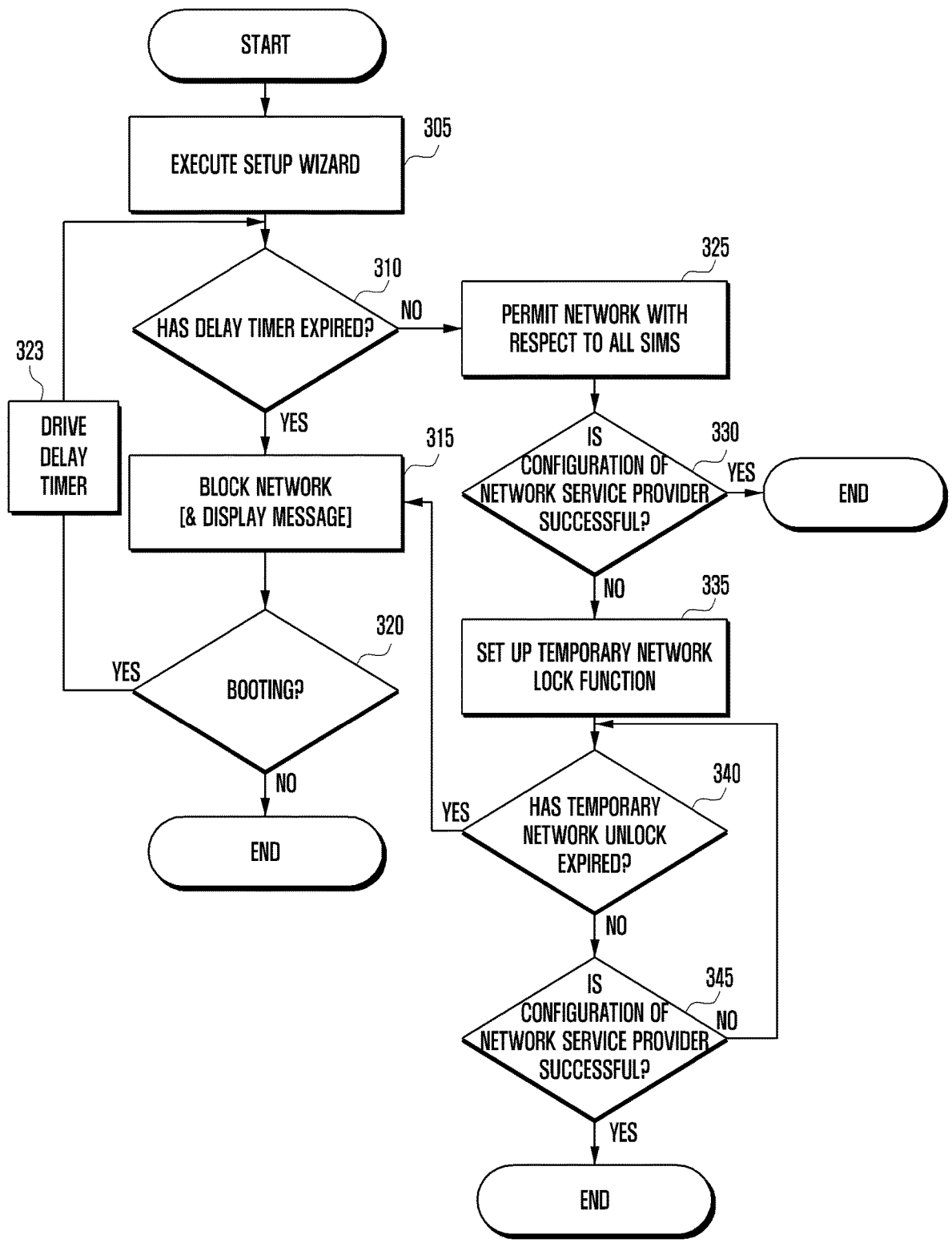
FIG. 3A is a flowchart of configuring an electronic device to be directed toward a specific network service provider by using a piece of software according to an embodiment.

FIG. 3A is a flowchart of configuring an electronic device to be directed toward a specific network service provider by using a piece of software according to an embodiment.

According to an embodiment, an electronic device (e.g., the electronic device 201 in FIG. 2) may be released after a lock is set up in the electronic device with respect to all subscriber identification modules (SIMs).

According to an embodiment, in operation 305, when being booted up, the electronic device 201 may execute software (e.g., a setup wizard) for setting up a network lock function (or configured to be directed toward a specific network service provider). The software for setting up the function of the network lock may be a program included or executed in one software environment. For example, the one software environment is an environment in which a plurality of programs (e.g., the operating system 142, the middleware 144, and the application 146 in FIG. 1) is executed, and may include an environment realized when binary files installed in the electronic device 201 during manufacturing process of the device are executed, for example. For example, at least a part of the setup wizard may be updated or a new software module may be added to the setup wizard during the network lock setup operation. When being booted up, the electronic device may operate a delay timer for setting up the network lock function. The delay timer may be a timer that identifies the time period in which the electronic device is permitted to connect to all networks in order to set up the network lock function. The expiration time of the delay timer may be set during the manufacturing the electronic device, and may be 5 minutes, for example.

According to an embodiment, in operation 310, the electronic device 201 may determine whether the delay timer has expired.

According to an embodiment, if it is determined that the delay timer has expired, in operation 315, the electronic device 201 may block a network. The electronic device 201 may display, on a display, a message that notifies the user that the network has been blocked.

According to an embodiment, in operation 320, the electronic device 201 may identify whether booting is performed. When the booting is performed, in operation 323, the electronic device 201 may drive the delay timer and may perform the process again from operation 310.

According to an embodiment, the electronic device 201 may perform an operation of setting up the network lock function prior to the expiration of the delay timer. In operation 325, the electronic device 201 may permit a network connection by using all SIMs for communication with all service providers which may be connected in relation to the setup of the network lock function.

According to an embodiment, in operation 330, the electronic device 201 may attempt a network service provider configuration, and may identify whether the configuration is successful. According to an embodiment, when the network service provider configuration is successful, the electronic device 201 is configured to be directed toward the network service provider, and the first processor 210 stores (or configures) information of the network service provider in the AID 216, as in the example described with reference to FIG. 2. Certain embodiments in which the electronic device 201 sets up a network lock function (or configured to be directed toward a network service provider) are specifically described with reference to drawings (FIGS. 4 to 7) below.

According to an embodiment, when not succeeding in the setup of the network service provider (or configured to be directed toward the network service provider), in operation 335, the electronic device 201 may temporarily set up a network lock function. The electronic device 201 may receive temporary network lock information from the server, and may temporarily set up the network lock function as "unlocked." The temporary network lock information may include at least some of a period (e.g., two weeks) in which the network lock is released, a release start time of the network lock, a release end time of the network lock, an identifier of the electronic device, or other information necessary to release the network lock, for example. Since a temporary server obstacle or the omission of information may occur, the electronic device 201 may temporarily set up the network lock function as "unlocked." In this case, the omitted information related to the setup of the network lock function of the electronic device may be added to the server manually.

According to an embodiment, in operation 340, the electronic device 201 may determine whether the "unlock" of the temporary network has expired.

According to an embodiment, if it is determined that the "unlock" of the temporary network has expired, the electronic device 201 may perform operation 315. The electronic device 201 may block the network. The electronic device 201 may further display a message that notifies the user that the network has been blocked.

According to an embodiment, if it is determined that the "unlock" of the temporary network has not expired, in operation 345, the electronic device 201 may attempt network service provider configuration and may identify whether the configuration is successful. Operation 345 may be identical with or similar to operation 330.

According to an embodiment, when not succeeding in the network service provider configuration, the electronic device 201 may perform the process again from operation 340.

According to an embodiment, when succeeding in the setup of the network lock function, the electronic device 201 may terminate the setup wizard.

According to an embodiment, the electronic device 201 may periodically/aperiodically perform operation 345 before the "unlock" of the temporary network expires and until the network lock function is set up.

Figure 3B:
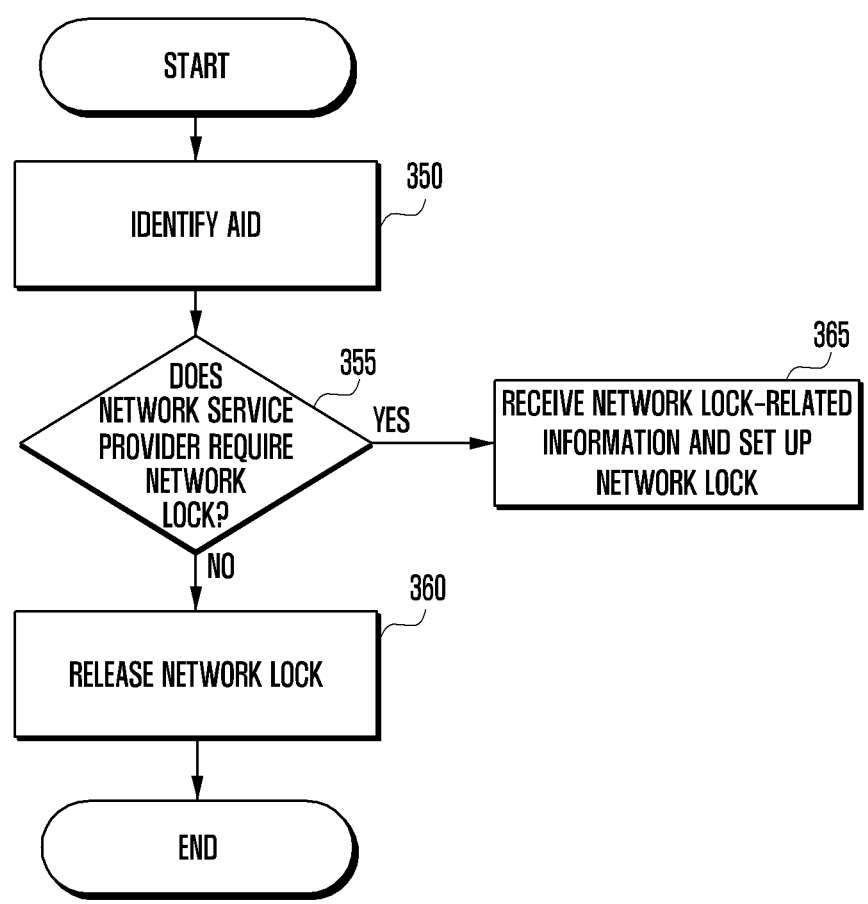
FIG. 3B is a flowchart of an operation of setting up a network lock in an electronic device configured to be directed toward a service provider according to an embodiment.

FIG. 3B is a flowchart of an operation of setting up a network lock in an electronic device configured to be directed toward a service provider according to an embodiment.

According to an embodiment, when being configured to be directed toward a service provider (or performing a network lock function), the electronic device 201 may be automatically or manually rebooted.

According to an embodiment, in operation 350, the electronic device 201 may identify an AID stored in a memory (e.g., the memory 230 in FIG. 2). In this case, the AID may be information of a network service provider.

According to an embodiment, in operation 355, the electronic device 201 may identify whether the identified network service provider is a service provider that requests a network lock.

According to an embodiment, if the identified network service provider does not request a network lock, in operation 360, the electronic device 201 may release a network lock. The electronic device 201 may set up the network lock function as "unlocked."

According to an embodiment, if the identified network service provider requests a network lock, in operation 365, the electronic device 201 may receive network lock-related information of the corresponding service provider from the server, and may activate a network lock. In this case, the network lock-related information may include a network permission list. The network permission list may include information on MCC/MNC about what SIM will be permitted by the corresponding service provider, for example.

Figure 4:
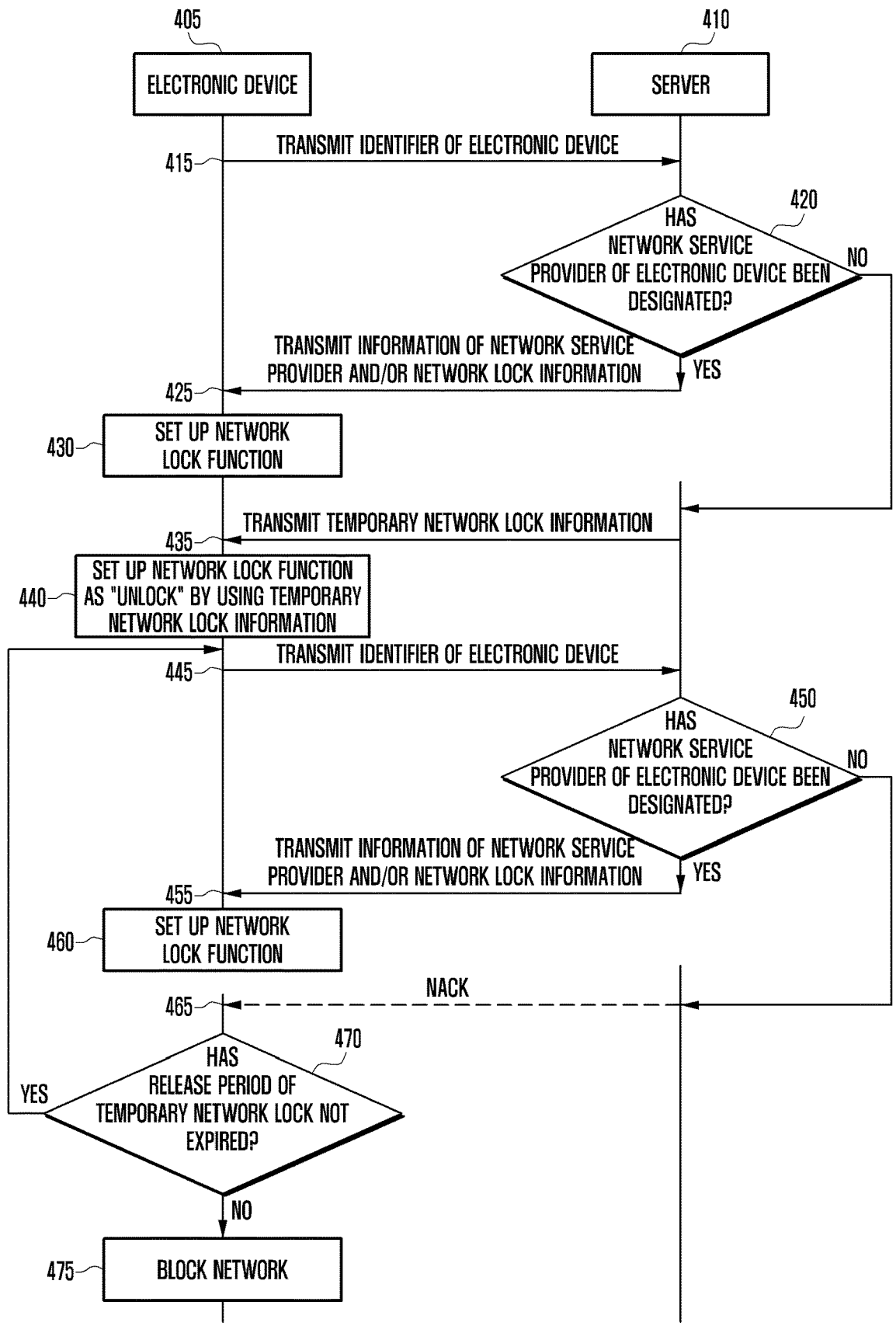
FIG. 4 is a flowchart of setting up the network lock function of an electronic device by using a piece of software based on a server according to an embodiment.

FIG. 4 is a flowchart of setting up the network lock function of an electronic device by using a piece of software based on a server according to an embodiment.

According to an embodiment, an electronic device 405 (e.g., the electronic device 201 in FIG. 2) may set up a network lock function without operating in conjunction with the signature of a server. A server 410 (e.g., the server 260 in FIG. 2) may be an electronic device in which information on a network service provider of the electronic device 405 is stored. For example, the manufacturer of the electronic device 405 may store, in the server 410, information of the network service provider based on an identifier of the electronic device 405. The manufacturer of the electronic device 405 may manufacture the electronic device 405 in accordance with requirements of the network service provider and store information on the electronic device 405 in the server 410. Furthermore, for example, the network service provider may construct the server 410 and store the identifier of the electronic device 405 and the information of the network service provider.

According to an embodiment, in operation 415, the electronic device 405 may transmit an identifier of the electronic device to the server 410 in order to set up the network lock function. For example, the electronic device 405 may transmit, to the server 410, at least one of international mobile equipment identity (IMEI), mobile equipment identifier (MEID), embedded multimedia card identifier (eMMC ID), eSIM ID, electronic device ID, communication processor identifier (CP ID), and application processor identifier (AP ID) as the identifier of the electronic device. In the disclosure, the ID is one of the IDs above, but may be any unique value that identifies the electronic device 405.

According to an embodiment, in operation 420, the server 410 may identify whether a network service provider of the electronic device 405 has been designated. Information of the network service provider and/or network lock information based on the identifier of an electronic device may be stored in the server 410. The server 410 may identify information of the network service provider and/or network lock information by using the transmitted identifier of the electronic device. At least some of the information of the network service provider and/or the network lock information may be information that is necessary for the electronic device 405 to set up the network lock function.

According to an embodiment, the network lock information may include at least one of temporary network lock password, network control key (NCK), master control key (MCK), network subset code key (NSCK), service provider control key (SPCK), subscriber identity module (SIM)/USIM lock (SIMCK), corporate lock key (CPCK) network lock or activation information of the network lock, set-up information for types of network lock or lock of subscriber identification information, or permission mobile country code (MCC)/mobile network code (MNC) list of service provider subscriber identification information, or a black MCC/MNC list. Furthermore, the network lock activation information may include information indicating whether network lock or unlock has been activated or if there is a temporary lock or temporary unlock state (information indicating the start time or end time of the temporary unlock), etc. For example, at least some of which network lock type (e.g., lock of a dual subscriber identifier module, lock of one subscriber identifier module, temporary lock, lock) is activated, group identifier (GID) level of the subscriber identifier module, and whether the network lock has been activated may be included in the network lock information.

According to an embodiment, when information of the network service provider and/or network lock information corresponding to the transmitted identifier of the electronic device are identified, in operation 425, the server 410 may transmit the information of the network service provider and/or the network lock information to the electronic device 405.

According to an embodiment, in operation 430, the electronic device 405 may store the received information of the network service provider in a memory (e.g., the memory 230 in FIG. 2) (e.g., replay protection memory block (RPMB), one time programmable (OTP), eFuse, UFS, or eMMC) as an activated ID (AID), and may set up the network lock function. The electronic device 405 may activate or deactivate the network lock based on the network lock information.

According to an embodiment, when information of the network service provider and/or network lock information corresponding to the transmitted identifier of the electronic device are not identified, in operation 435, the server 410 may transmit temporary network lock information to the electronic device 405. The temporary network lock information may be information that is valid for a given period (e.g., two weeks). The temporary network lock information may include information such as information about a period in which a network lock is released, a release start time of the network lock, a release end time of the network lock, the identifier of the electronic device, or other information necessary to release the network lock, for example.

According to an embodiment, in operation 440, the electronic device 405 may temporarily set up the network lock function as "unlocked" by using the temporary network lock information. The electronic device 405 may periodically communicate with the server 410 in order to set up the network lock function for a period in which the network lock has been set up as "unlocked" based on the temporary network lock information.

According to an embodiment, in operation 445, the electronic device 405 may transmit the identifier of the electronic device to the server 410 in order to set up the network lock function again.

According to an embodiment, in operation 450, the server 410 may identify whether a network service provider of the electronic device 405 has been designated.

According to an embodiment, when identifying information of the network service provider and/or network lock information corresponding to the transmitted identifier of the electronic device, in operation 455, the server 410 may transmit the information of the network service provider and/or the network lock information.

According to an embodiment, in operation 460, the electronic device 405 may store the information of the network service provider and set up the network lock function. The electronic device 405 may activate or deactivate a network lock based on the received network lock information.

According to an embodiment, operation 445 to operation 460 may be identical with or similar to operation 415 to operation 430, and they may be omitted herein in order to avoid redundant description.

According to an embodiment, when information of the network service provider and/or network lock information corresponding to the transmitted identifier of the electronic device are not identified, in operation 465, the server 410 may transmit NACK to the electronic device 405. Operation 465 may be omitted.

According to an embodiment, if a given time interval elapses in the state in which information of the network service provider and/or network lock information has not been received from the server 410 or a given time interval elapses after NACK is received from the server 410, the electronic device 405 may identify whether the release period of the temporary network lock received in operation 435 has not expired (operation 470).

According to an embodiment, when it is determined that the period in which the temporary network lock is released has elapsed, in operation 475, the electronic device 405 may block a network. According to an embodiment, the electronic device 405 may not permit all subscriber identification modules by blocking the network. According to an embodiment, the electronic device 405 may not perform communication with an external device and over the network by blocking the network.

According to an embodiment, when it is determined that the release period of the temporary network lock has not expired, the electronic device 405 may perform the process again from operation 445.

Figure 5:
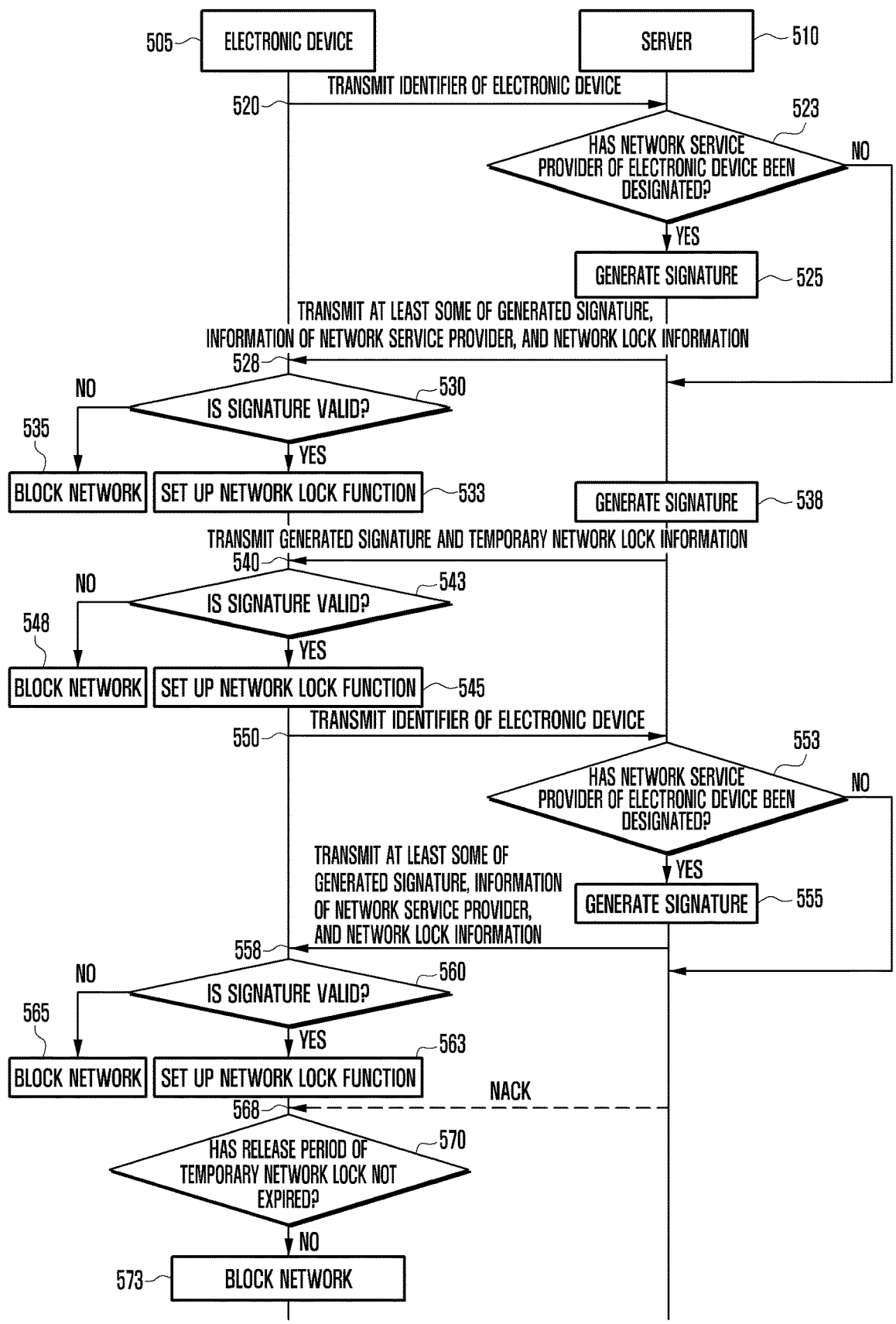
FIG. 5 is a flowchart of setting up the network lock function of an electronic device by using a piece of software based on a server and a signature of the server according to an embodiment.

FIG. 5 is a flowchart of setting up the network lock function of an electronic device by using a piece of software based on a server and a signature of the server according to an embodiment.

According to an embodiment, an electronic device 505 (e.g., the electronic device 201 in FIG. 2) may set up a network lock function while operating in conjunction with a signature of a server. A server 510 in FIG. 6 may be a server identical with or similar to the server 410 described with reference to FIG. 4.

According to an embodiment, in operation 520, the electronic device 505 may transmit an identifier of the electronic device to the server 510 in order to set up a network lock function. For example, the electronic device 505 may transmit, to the server 510, at least one of IMEI, MEID, eMMC ID, eSIM ID, electronic device ID, CP ID, and AP ID as the identifier of the electronic device.

According to an embodiment, in operation 523, the server 510 may identify whether a network service provider of the electronic device 505 has been designated. Information of the network service provider and/or network lock information based on the identifier of the electronic device may be stored in the server 510. The server 510 may identify information of the network service provider and/or network lock information by using the transmitted identifier of the electronic device.

According to an embodiment, in operation 525, the server 510 may generate a signature for the electronic device 505. The signature generated by the server 510 may be used by the electronic device 505 in order to determine whether information transmitted by the server 510 is valid.

According to an embodiment, when information of the network service provider and/or network lock information corresponding to the transmitted identifier of the electronic device are identified, in operation 528, the server 510 may transmit at least some of the generated signature, the information of the network service provider, and the network lock information to the electronic device 505.

According to an embodiment, in operation 530, the electronic device 505 may identify whether the signature transmitted by the server 510 is valid.

According to an embodiment, when the signature transmitted by the server 510 is valid, the electronic device 505 may store the information of the network service provider in a memory (e.g., the memory 230 in FIG. 2, OTP, eFuse, UFS, or eMMC) as an AID, and may set up the network lock function (operation 533). The electronic device 505 may activate or deactivate a network lock based on the network lock information.

According to an embodiment, when the signature transmitted by the server 510 is not valid, the electronic device 505 may block the network (operation 535).

According to an embodiment, when not identifying information of the network service provider and/or network lock information corresponding to the transmitted identifier of the electronic device, the server 510 may generate a signature for the electronic device 505 (operation 538).

According to an embodiment, in operation 540, the server 510 may transmit temporary network lock information and the generated signature to the electronic device 505. The temporary network lock information may be information that is valid for a given period (e.g., two weeks). The temporary network lock information may include information such as information on a period in which a network lock is released, a release start time of the network lock, a release end time of the network lock, the identifier of the electronic device, or other information necessary to release the network lock, for example.

According to an embodiment, in operation 543, the electronic device 505 may identify whether the signature transmitted by the server 510 is valid.

According to an embodiment, when the signature transmitted by the server 510 is not valid, the electronic device 505 may block the network (operation 548).

According to an embodiment, in operation 545, the electronic device 505 may temporarily set up the network lock function as "unlocked" by using the temporary network lock information. The electronic device 505 may periodically communicate with the server 510 in order to set up the network lock function for a period in which the network lock has been set up as "unlocked" based on the temporary network lock information.

According to an embodiment, in operation 550, the electronic device 505 may transmit the identifier of the electronic device to the server 510 in order to set up the network lock function again.

According to an embodiment, in operation 553, the server 510 may identify again whether a network service provider of the electronic device 505 has been designated.

According to an embodiment, in operation 555, the server 510 may generate a signature for the electronic device 505.

According to an embodiment, when information of the network service provider and/or network lock information corresponding to the transmitted identifier of the electronic device are identified, in operation 558, the server 510 may transmit at least some of the generated signature, the information of the network service provider, and the network lock information.

According to an embodiment, in operation 560, the electronic device 505 may identify whether the signature transmitted by the server 510 is valid.

According to an embodiment, when the signature transmitted by the server 510 is valid, the electronic device 505 may store the information of the network service provider in the memory (e.g., the memory 230 in FIG. 2, OTP, eFuse, UFS, or eMMC) as an AID, and may set up the network lock function (operation 563).

According to an embodiment, when the signature transmitted by the server 510 is not valid, the electronic device 505 may block the network (operation 565).

According to an embodiment, operation 550 to operation 565 may be identical with or similar to operation 520 to operation 535, and they may be omitted herein in order to avoid a redundant description.

According to an embodiment, when information of the network service provider and/or network lock information corresponding to the transmitted identifier of the electronic device are not identified, in operation 568, the server 510 may transmit NACK to the electronic device 505. Operation 568 may be omitted.

According to an embodiment, if a given time interval elapses in the state in which information of the network service provider and/or network lock information have not been received from the server 510 or a given time interval elapses after NACK is received from the server 510, the electronic device 505 may identify whether the release period of the temporary network lock received in operation 540 has not expired (operation 570).

According to an embodiment, when it is determined that the period in which the temporary network lock is released has elapsed, in operation 573, the electronic device 505 may block the network. According to an embodiment, the electronic device 505 may not permit all subscriber identification modules by blocking the network. According to an embodiment, the electronic device 505 may not perform communication with an external device by blocking the network.

According to an embodiment, when it is determined that the release period of the temporary network lock has not expired, the electronic device 505 may perform the process again from operation 550.

Figure 6:
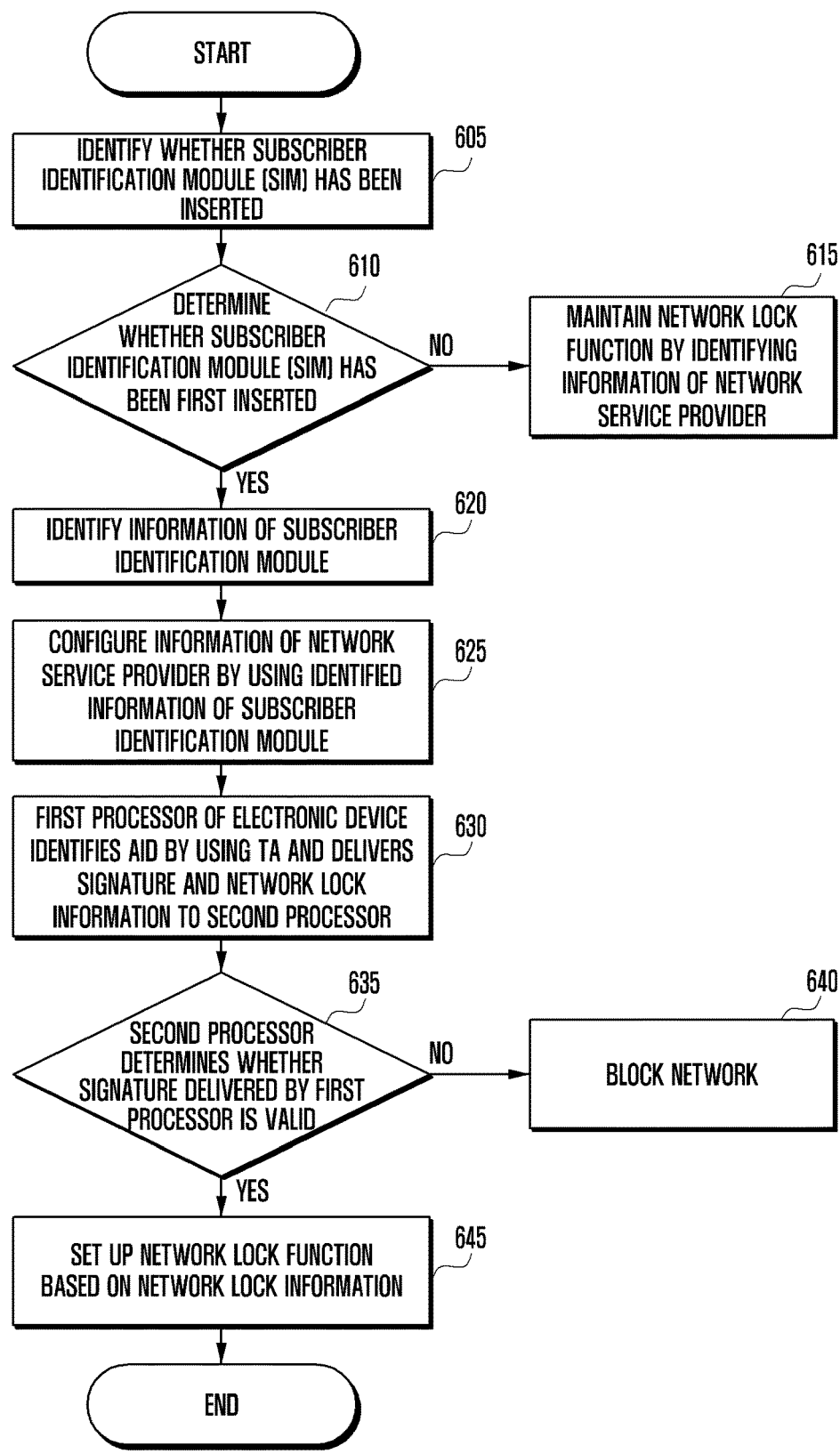
FIG. 6 is a flowchart of setting up a network lock function based on a SIM in an electronic device according to an embodiment.

FIG. 6 is a flowchart of setting up the network lock function based on a SIM in an electronic device according to an embodiment.

According to an embodiment, an electronic device (e.g., the electronic device 201 in FIG. 2) may be released without being configured to be directed toward a specific network service provider during manufacturing. The electronic device 201 may be released in the state in which the electronic device has been blocked against all SIMs. The electronic device 201 may be released in the state in which a network lock has not been set up.

According to an embodiment, the electronic device 201 may set up a network lock function by using a SIM first inserted thereto because the network lock is not set up. The electronic device 201 may set up the network lock function by using the SIM and a piece of software.

According to an embodiment, in operation 605, the electronic device 201 may identify whether a subscriber identification module (SIM) (e.g., the subscriber identification module 240 in FIG. 2) has been inserted into the electronic device 201. For example, when receiving a signal from a sensor module (e.g., the sensor module 176 in FIG. 1), a first processor (e.g., the first processor 210 in FIG. 2) of the electronic device 201 may determine that the subscriber identification module 240 has been inserted. Furthermore, for example, when power of the electronic device 201 is turned on, the electronic device 201 may identify whether the subscriber identification module 240 has been inserted. When determining that the subscriber identification module 240 has been inserted, the electronic device 201 may execute a wizard (or application) for setting up the network lock function. The wizard for setting up the network lock function may correspond to a piece of software, and may be executed by the first processor 210, for example.

According to an embodiment, in operation 610, the electronic device 201 may determine whether this is the first instance in which the subscriber identification module 240 is inserted. The first processor 210 of the electronic device may determine whether the subscriber identification module 240 has been first inserted. When the subscriber identification module 240 is inserted, a flag indicating whether information of a network service provider is present or not may be set while the information of the network service provider is stored in a memory (e.g., the memory 230 in FIG. 2, OTP, eFuse, UFS, or eMMC). Thereafter, the electronic device 201 may identify whether the subscriber identification module 240 has been first inserted by reading the flag. For example, when it is determined that the identified flag has not been set and the subscriber identification module 240 has been inserted, the electronic device 201 may determine that the subscriber identification module 240 has been first inserted (i.e. this is the first time in which the subscriber identification module 240 is inserted).

According to an embodiment, if the subscriber identification module 240 is not first inserted, in operation 615, the electronic device 201 may maintain the network lock function by identifying information of the network service provider. The first processor 210 of the electronic device may instruct the second processor 220 to maintain the network lock function.

According to an embodiment, when determining that the subscriber identification module 240 is first inserted, in operation 620, the electronic device 201 may identify information (e.g., an international mobile subscriber identifier (IMSI)) of the subscriber identification module. According to an embodiment, the second processor 220 of the electronic device may also identify whether the subscriber identification module 240 has been inserted. For example, the second processor 220 of the electronic device may also identify whether the subscriber identification module 240 has been inserted through the sensor module 176. Furthermore, for example, when the subscriber identification module 240 is inserted, the first processor 210 of the electronic device may notify the second processor 220 of the electronic device that the subscriber identification module 240 has been inserted. When it is determined that the subscriber identification module 240 has been inserted, the second processor 220 of the electronic device may deliver the information of the subscriber identification module to the first processor 210 of the electronic device. The information of the subscriber identification module may include information on a country (mobile country code (MCC)) to which a subscriber of an electronic device belongs and information on a subscriber network service provider (mobile network code (MNC)) of the electronic device.

According to an embodiment, in operation 625, the electronic device 201 may configure (or store) information of a network service provider by using the identified information of the subscriber identification module. For example, the first processor 210 of the electronic device may store the information of the network service provider as an AID. When the electronic device 201 stores information of the specific network service provider as an AID, the electronic device 201 may have been configured to be directed toward the specific network service provider. Thereafter, the electronic device 201 may identify the network service provider by identifying the AID. The electronic device 201 may identify the information of the network service provider, based on information on the country to which the subscriber of the electronic device belongs and information on a subscriber network service provider of the electronic device which are included in the information of the subscriber identification module. The electronic device 201 may store the identified information of the network service provider in a memory (e.g., the memory 230 in FIG. 2, OTP, eFuse, UFS, or eMMC).

According to an embodiment, in operation 630, the first processor 210 of the electronic device 201 may identify the AID stored in a security region of a memory (e.g., the memory 230 in FIG. 2, OTP, eFuse, UFS, or eMMC) by using a trusted application (TA) (e.g., the TA 214 in FIG. 2), and may deliver a signature and network lock information to the second processor 220.

According to an embodiment, the network lock information may include at least one of temporary network lock password, network control key (NCK), master control key (MCK), network subset code key (NSCK), service provider control key (SPCK), subscriber identity module (SIM)/USIM lock (SIMCK), corporate lock key (CPCK) network lock, or activation information of a network lock, set-up information for types of network lock or lock of the subscriber identification information, or permission mobile country code (MCC)/mobile network code (MNC) list of service provider subscriber identification information, or black MCC/MNC list. The network lock password may include a network control key, an SP control key, a master control key, or a subset control key. The network lock activation information may include information indicating whether a network lock or unlock has been activated. For example, the type of network lock may include a subset lock, an SP lock, a CP lock, a USIM lock, etc. According to an embodiment, the network lock information may be stored in a non-volatile (NV) memory of the second processor 220.

According to an embodiment, the first processor 210 may deliver, to the second processor 220, at least some of the network lock type, a network lock flag, a SIM permission list, or a GID, as pieces of network lock information. According to an embodiment, the first processor 210 may deliver, to the second processor 220, some of the AID, a network lock type, a network lock flag, a SIM permission list, or a GID corresponding to an IMEI.

According to an embodiment, in operation 635, the second processor 220 may determine whether a signature delivered by the first processor 210 is valid.

According to an embodiment, when determining that the signature is not valid, the second processor 220 may block the network (operation 640). When the network is blocked, the electronic device 201 may not perform communication with an external device.

According to an embodiment, in operation 645, the second processor 220 may set up the network lock function based on the received network lock information. For example, the second processor 220 may identify whether the network lock is activation or deactivation (i.e., "unlocked") based on the network lock information. When the network lock is activated, the electronic device 201 may permit only the specific service provider corresponding to the inserted SIM, and may block other service providers. When the network lock is deactivated, the electronic device may permit the SIMs of all service providers, and thus networks based on the SIMs may be permitted. The second processor 220 may set up the network lock based on the network lock type included in the network lock information. For example, when the network lock type is Permanent unlock, the second processor 220 may permanently release the network lock. When the network lock type is Temporary unlock, the network lock may be released only for a predetermined period.

Figure 7:
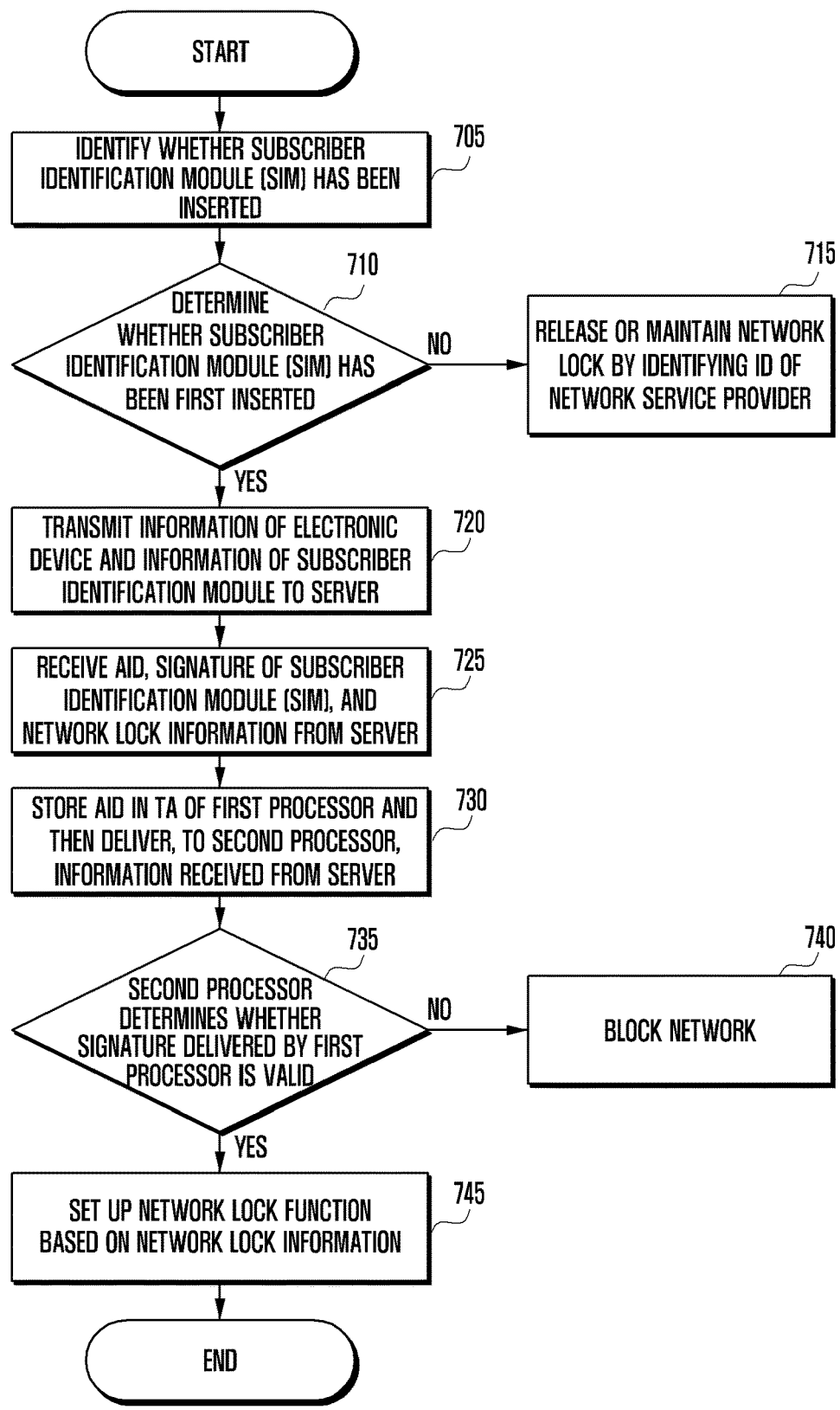
FIG. 7 is a flowchart of setting up the network lock function by using information received from a server based on an SIM in an electronic device according to an embodiment.

FIG. 7 is a flowchart of setting up the network lock function by using information received from a server based on an SIM in an electronic device according to an embodiment.

According to an embodiment, an electronic device (e.g., the electronic device 201 in FIG. 2) may be released into the market without storing information on a network service provider during manufacturing. The electronic device 201 may be released in the state in which the electronic device has been blocked against all SIMs. The electronic device 201 may be released in the state in which a SIM lock has not been set up.

According to an embodiment, the electronic device 201 may set up a network lock function by using a SIM first inserted into the electronic device 201 because a SIM lock has not been set up. Since information of the network service provider and network lock information are stored in a server, the electronic device 201 may transmit, to the server, information of the SIM by using a piece of software, and may set up the network lock function by using the information received from the server.

According to an embodiment, in operation 705, the electronic device 201 may identify whether a subscriber identification module (SIM) has been inserted. For example, when receiving a signal from a sensor module (e.g., the sensor module 176 in FIG. 1), a first processor (e.g., the first processor 210 in FIG. 2) of the electronic device 201 may determine that a subscriber identification module has been inserted. Furthermore, for example, when power of the electronic device 201 is turned on, the electronic device 201 may identify whether the subscriber identification module 240 has been inserted. When identifying the subscriber identification module 240, the electronic device 201 may execute a wizard (or application) for setting up the network lock function. The wizard for setting up the network lock function may correspond to a piece of software, and may be executed by the first processor 210, for example.

According to an embodiment, in operation 710, the electronic device 201 may determine whether the subscriber identification module (SIM) has been first inserted, (i.e. whether it is the first time this SIM is inserted).

According to an embodiment, when determining that the subscriber identification module 240 is not first inserted, in operation 715, the electronic device 201 may maintain the network lock function by identifying information of the network service provider that was previously stored because the SIM was previously inserted.

According to an embodiment, operation 710 and operation 715 may be identical with or similar to operation 610 and operation 615 in FIG. 6, and they may be omitted in order to avoid redundancy of description.

According to an embodiment, when determining that the subscriber identification module 240 is first inserted, in operation 720, the electronic device 201 may transmit, to the server 260, information (e.g., IMEI, eMMC ID, electronic device ID, CP ID, or AP ID) of the electronic device and information (e.g., international mobile subscriber identifier (IMSI)) of the subscriber identification module. For example, when the first processor 210 of the electronic device 201 delivers the information of the electronic device to the second processor 220, the second processor 220 may further identify information of the subscriber identification module and transmit the identified information to the server 260 along with the information of the electronic device.

According to an embodiment, in operation 725, the electronic device 201 may receive information on a network service provider (e.g., an identifier of a network service provider), a signature, and network lock information from the server 260. According to an embodiment, the server 260 may store information on the network service provider and network lock information which are matched with the information of the electronic device and/or the information of the subscriber identification module. When the electronic device 201 requests the network service provider information and the network lock information, the server 260 may identify and transmit the network service provider information and the network lock information.

According to an embodiment, in operation 730, the first processor 210 of the electronic device 201 may identify an AID stored in a security region (e.g., replay protection memory block) of a memory (e.g., the memory 230 in FIG. 2, OTP, eFuse, UFS, or eMMC) by using a TA (e.g., the TA 214 in FIG. 2), and may deliver the signature and network lock information to the second processor 220.

According to an embodiment, the network lock information may include at least one of temporary network lock password, network control key (NCK), master control key (MCK), network subset code key (NSCK), service provider control key (SPCK), subscriber identity module (SIM)/USIM lock (SIMCK), corporate lock key (CPCK) network lock, or activation information of a network lock, set-up information for types of network lock or lock of the subscriber identification information, or permission mobile country code (MCC)/mobile network code (MNC) list of service provider subscriber identification information, or black MCC/MNC list. The network lock password may include a network control key, an SP control key, a master control key, or a subset control key. The network lock activation information may include information indicating whether the network lock or unlock is activated. For example, the type of network lock may include a subset lock, an SP lock, a CP lock, a USIM lock, etc.

According to an embodiment, the first processor 210 may deliver, to the second processor 220, at least some of network lock type, network lock flag, SIM permission list, or GID as pieces of network lock information. According to an embodiment, the first processor 210 may deliver, to the second processor 220, some of an AID, the network lock type, the network lock flag, the SIM permission list, or the GID corresponding to an IMEI.

According to an embodiment, in operation 735, the second processor 220 may determine whether the signature delivered by the first processor 210 is valid.

According to an embodiment, when determining that the signature is not valid, the second processor 220 may block the network (operation 740). When a network is blocked, the electronic device 201 may not perform communication with an external device.

According to an embodiment, in operation 745, the second processor 220 may set up the network lock function based on the received network lock information. For example, the second processor 220 may identify whether the network lock is to be activated or deactivated (i.e., "unlocked") based on the network lock information. When the network lock is activated, the electronic device 201 may permit only the specific service provider corresponding to the particular SIM, and may block other networks. When the network lock is deactivated, the electronic device may permit the SIMs of all service providers, and thus networks based on the SIMs may be permitted. The second processor 220 may set up the network lock based on the network lock type included in the network lock information. For example, when the network lock type is Permanent unlock, the second processor 220 may permanently release the network lock.

When the network lock type is Temporary unlock, the network lock may be released only for a predetermined period.

Figure 8:
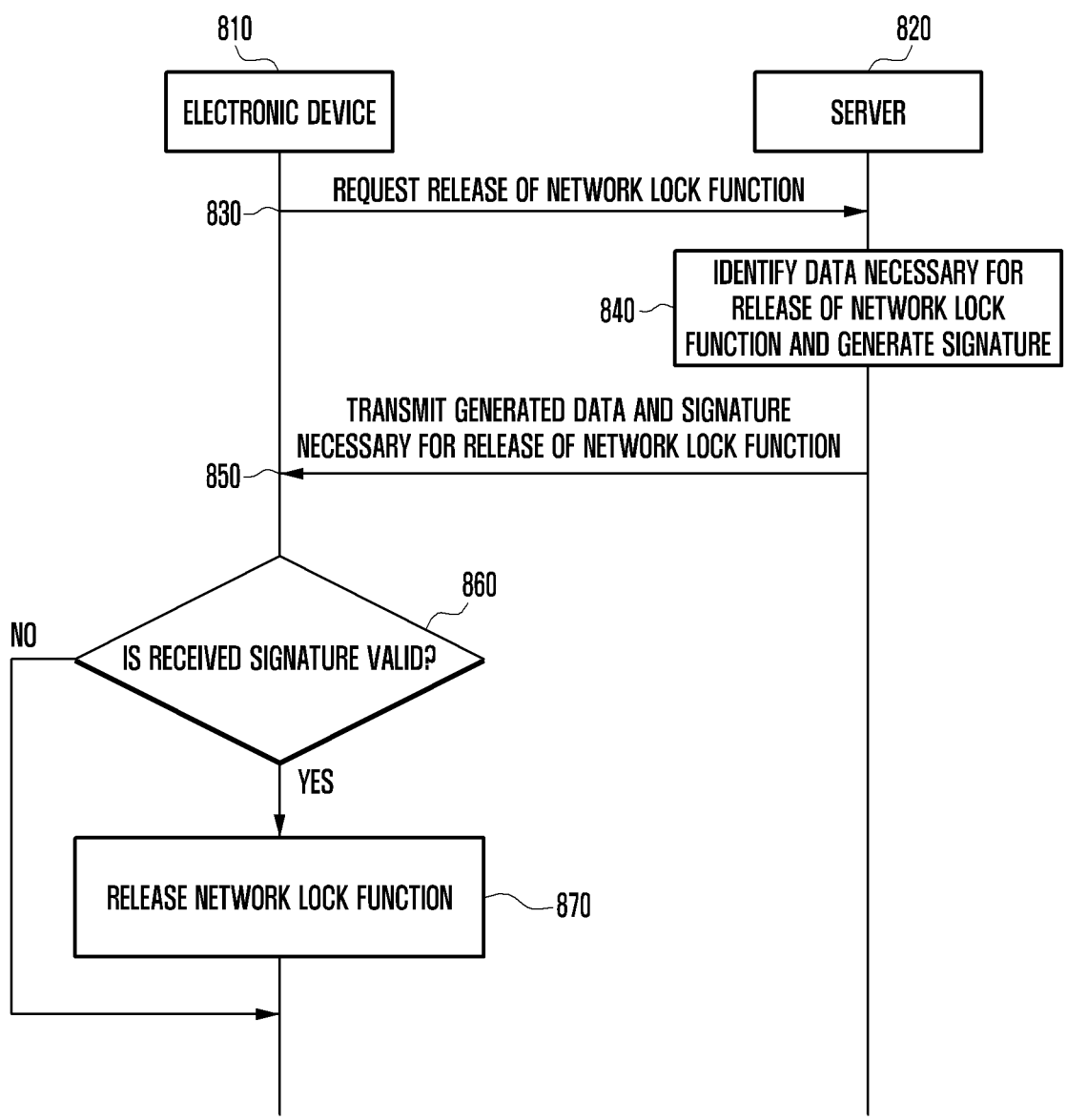
FIG. 8 is a flowchart of releasing the network lock function of an electronic device that has been previously set up in response to a request from a user according to an embodiment.

FIG. 8 is a flowchart of releasing the network lock function of an electronic device that has been previously set up in response to a request from a user according to an embodiment.

The electronic device may be in a state in which the network lock function has been set up according to one of the aforementioned various embodiments. Thereafter, the electronic device may require the release of the set-up network lock function. For example, if the user goes abroad while carrying the electronic device or a contract with the network service provider expires, the electronic device may require the release of the network lock function.

According to an embodiment, the user may directly attempt the release of a previously set-up network lock function (or the deactivation of the network lock) by using a user interface. An example of the user interface for enabling the user to release the network lock function of the electronic device will be described in detail with reference to FIGS. 9A to 9F.

According to an embodiment, in operation 830, an electronic device 810 may request the release of the network lock function from a server 820. The electronic device 810 may be an electronic device in which the network lock function has been set up. When receiving an input from the user interface related to the release of the network lock function, the electronic device 810 may perform operation 830. For the release of the network lock function, the electronic device 810 may transmit, to the server 820, information (e.g., IMEI, MEID, eMMC ID, eSIM ID, electronic device ID, CP ID, or AP ID) on the electronic device 810. When identifying information on the network (e.g., information of the network service provider (AID)), the electronic device 810 may also further transmit the information on the network.

According to an embodiment, in operation 840, the server 820 may generate data and a signature necessary for the release of the network lock function of the electronic device 810. For example, the server 820 may generate the signature by using at least one of SIM lock data, the information on the electronic device 810, or the information on the network.

According to an embodiment, in operation 850, the server 820 may transmit, to the electronic device 810, the generated data and signature necessary for the release of the network lock function.

According to an embodiment, in operation 860, the electronic device 810 may identify whether the received signature is valid.

According to an embodiment, when the received signature of the server is valid, in operation 870, the electronic device 810 may release the network lock function (or deactivate the network lock) by using the received data necessary for the release of the network lock function. When the network lock function is released, the electronic device 810 may perform communication by using a network of another network service provider in addition to the previously set-up network service provider.

According to an embodiment, when identifying that the signature of the server 820 is not valid, the electronic device 810 may not release the network lock function. For example, the electronic device 810 may not perform the operation for releasing the network lock function. When the network lock function is not released, the electronic device 810 may not perform communication by using a network of another network service provider, and may still be locked to the pre-configured network.

FIGS. 9A to 9F are user interfaces in which a network lock function is released in response to a request from a user according to an embodiment.

The user may release the network lock function of the electronic device by using a setting menu (settings). FIGS. 9A to 9F illustrate examples of a user interface. The names or a paths of the menus may be different.

Figure 9A:
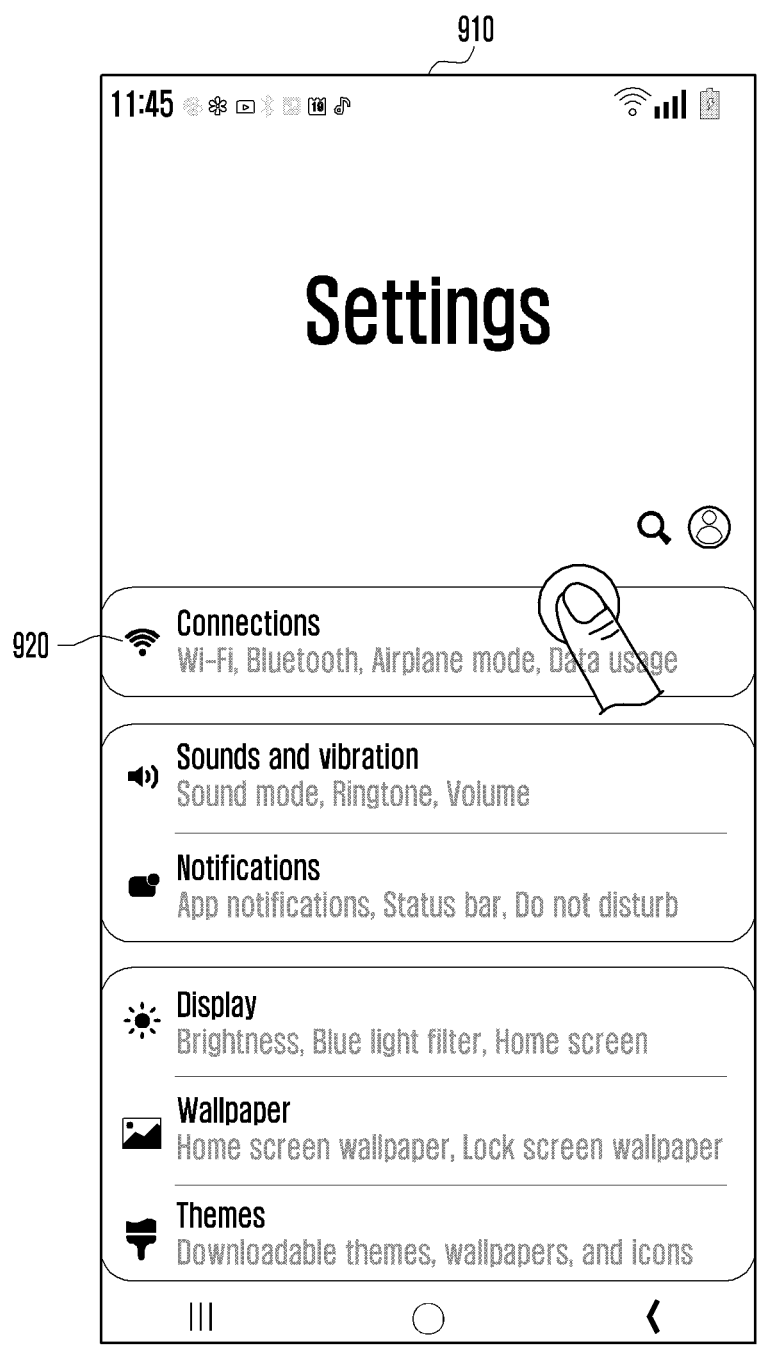
FIGS. 9A to 9F are user interfaces in which a network lock function is released in response to a request from a user according to an embodiment.

FIG. 9A illustrates an example of a setting menu installed in an electronic device 910. With reference to FIG. 9A, the setting menu may include a menu called "Connections" 920 related to network configuration. In order to release the network lock function of the electronic device 910, the user may select "Connections" 920 in the setting menu. When the user selects (e.g., touches) "Connections" 920, a user interface, such as FIG. 9B, may be displayed on a display.

Figure 9B:
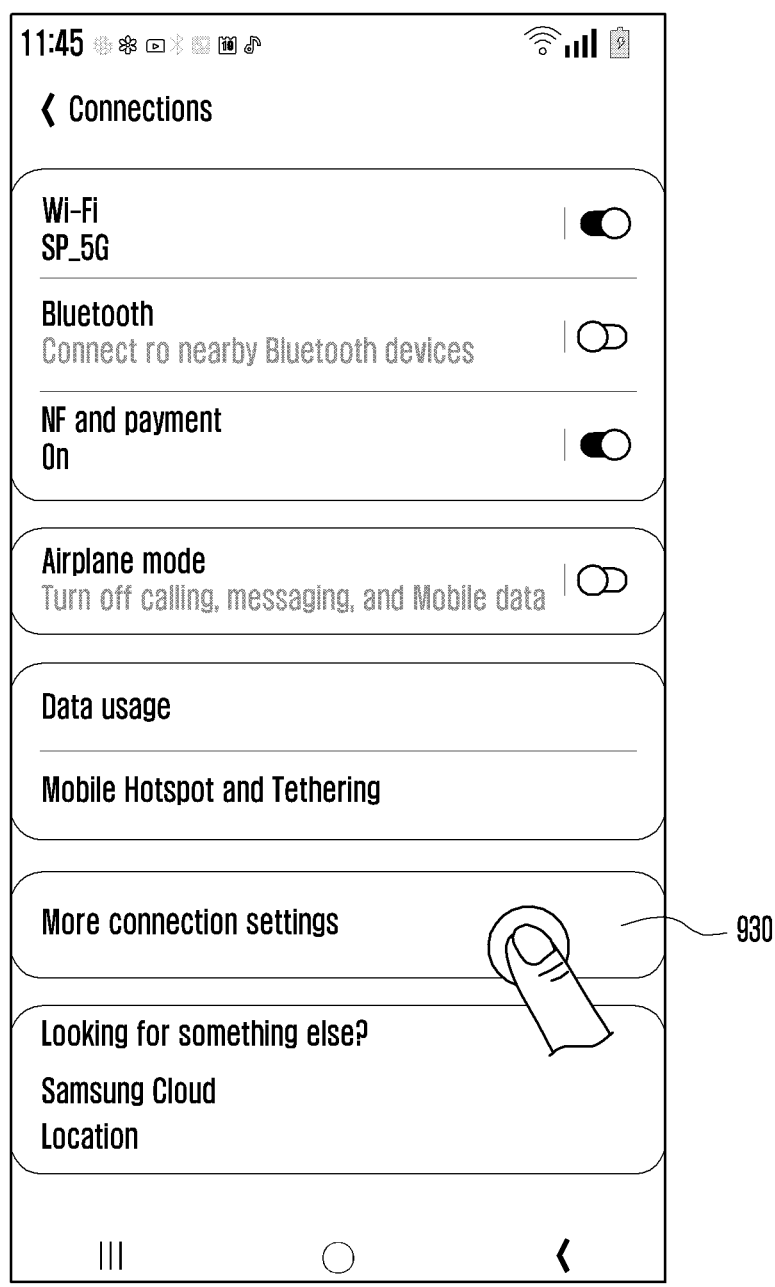

FIG. 9B may illustrate a user interface in which various networks available for the electronic device 910 may be configured. The user may select "More connection settings" 930 because the menu for releasing the network lock function of the electronic device 910 is not present in FIG. 9B. When the user selects (e.g., touches) "More connection settings" 930, a user interface, such as FIG. 9C, may be displayed on a display.

Figure 9C:
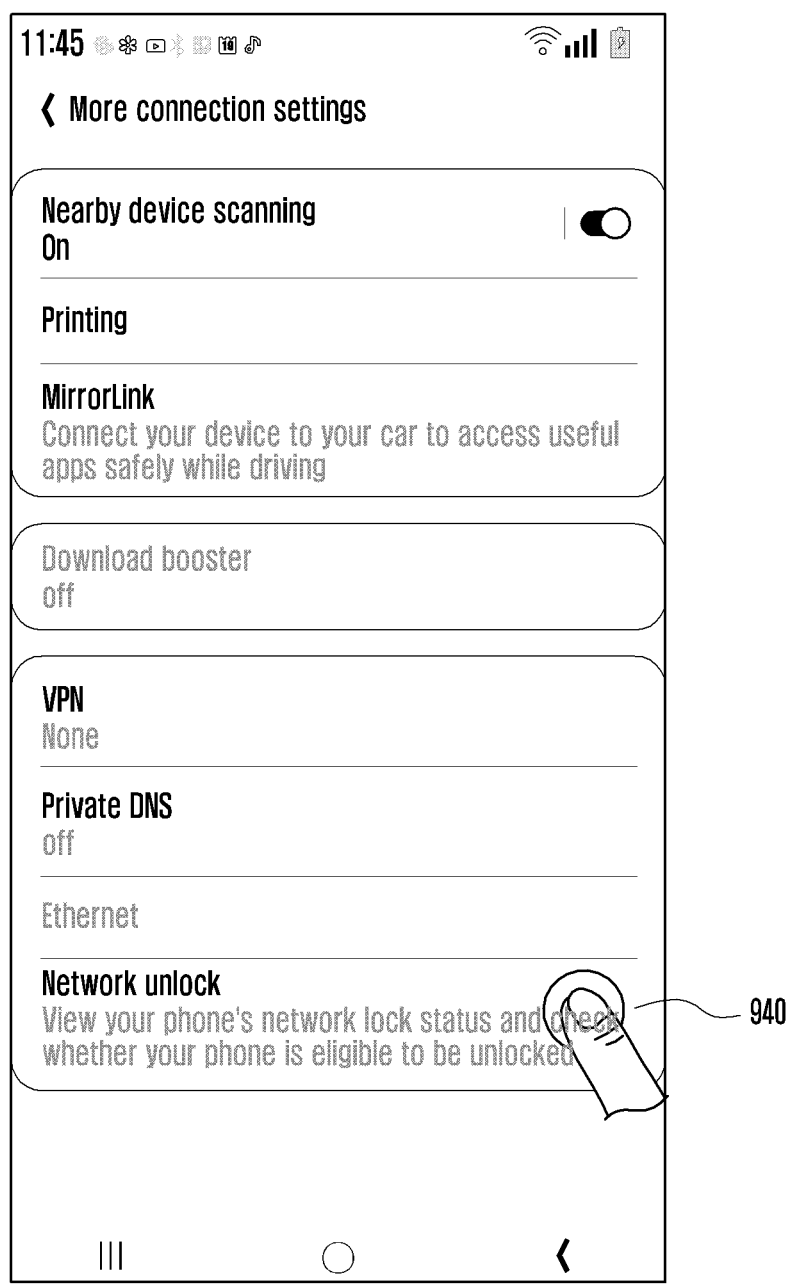

FIG. 9C may illustrate a user interface in which network settings not displayed in FIG. 9B may be configured. In order to release the network lock function of the electronic device 910, the user may select "Network unlock" 940.

Figure 9D:
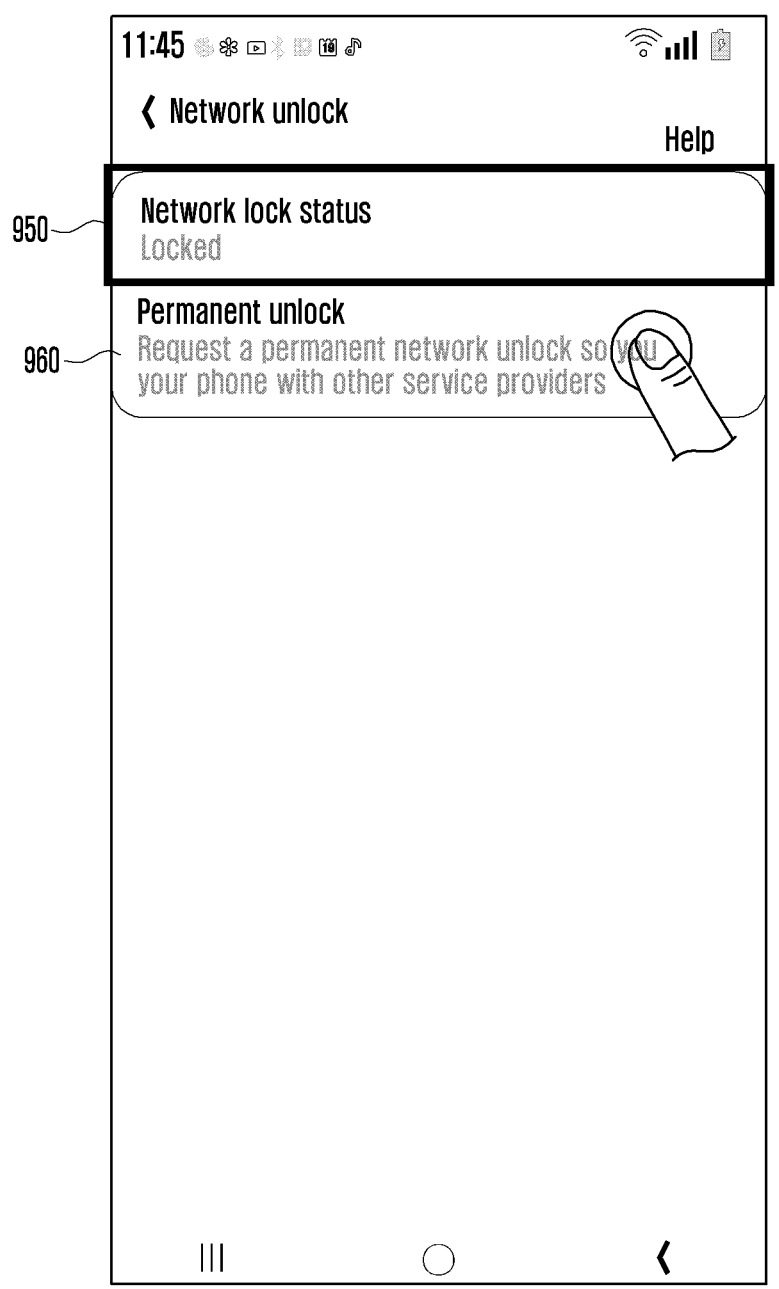

FIG. 9D may illustrate a user interface that enables Network unlock, that is, to release the network lock function. With reference to FIG. 9D, the user may identify that the network lock function has been set up in the menu "Network lock status" 950. With reference to "Network lock status" 950, it is shown that the network lock function has not been released. The user may attempt the permanent release of the network lock function of the electronic device 910 by selecting "Permanent unlock" 960. Furthermore, for example, Temporary unlock (not illustrated) may be present. When Temporary unlock is selected, the network lock function of the electronic device 910 may be temporarily released. Temporary unlock may also require the signature of a server.

Figure 9E:
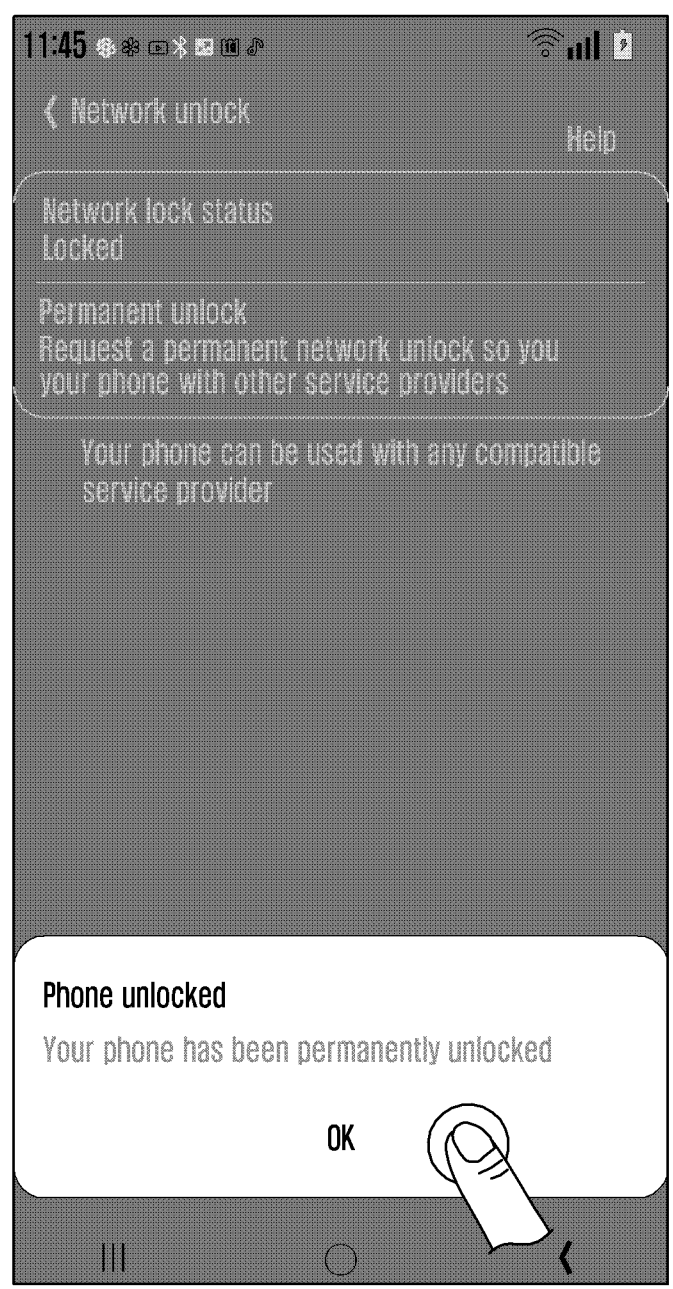

FIG. 9E illustrates a user interface illustrating the results of the network lock function released by the electronic device 910 through communication with a server. With reference to FIG. 9E, the user may identify whether the network lock function of the electronic device 910 has been released.

Figure 9F:
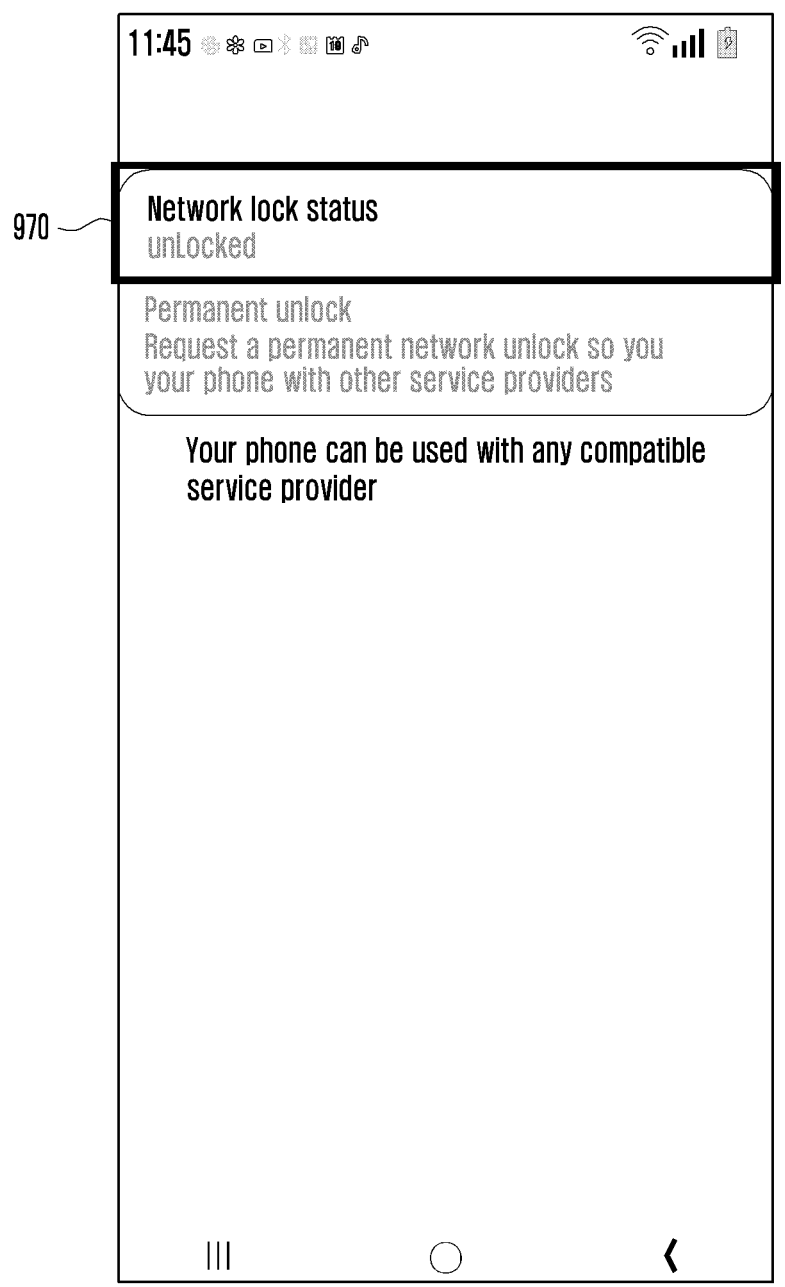

FIG. 9F illustrates a user interface incorporated into a menu of the electronic device 910 after the network lock function is released. When comparing FIGS. 9D and 9F, it may be seen that the menus 950 and 970 indicating a state of the network lock function of the electronic device 910 have been changed.

Figure 10:
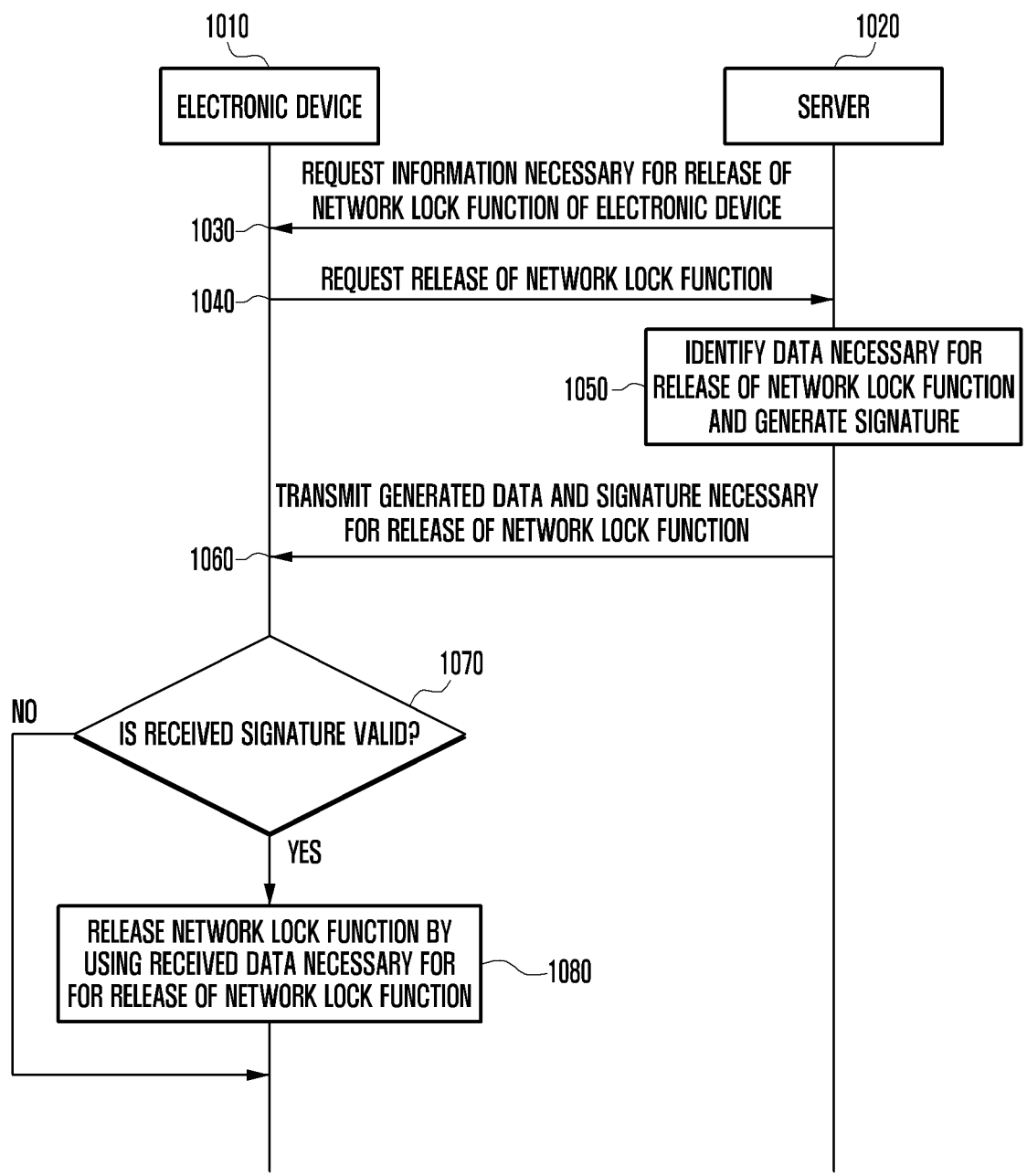
FIG. 10 is a flowchart of releasing, by a sever, the network lock function of an electronic device that has been previously configured according to an embodiment.

FIG. 10 is a flowchart of releasing, by a sever, the network lock function of an electronic device that has been previously set up according to an embodiment.

The method described with reference to FIG. 10 may be a method of releasing, by a server, a previously set-up network lock function of an electronic device when a determined condition is satisfied. For example, when a condition for releasing a previously set-up network lock function of an electronic device is satisfied (e.g., full payment of a contract by the user), the network service provider may release the network lock function of the electronic device through a server even without a request from the user for user convenience.

According to an embodiment, in operation 1030, in order to release the previously set-up network lock function of the electronic device 1010, the server 1020 may request, from the electronic device 1010, information necessary for the release of the network lock function of the electronic device 1010. For example, when the electronic device 1010 transmits a predefined message to the server 1020, the server 1020 may determine whether the network lock function of the electronic device 1010 is to be released. The request of the server 1020 may be an input identical with or similar to the input of the user in the user interface of FIG. 8.

According to an embodiment, in operation 1040, the electronic device 1010 may transmit the information necessary for the release of the network lock function. In order to release the network lock function, the electronic device 1010 may transmit information (e.g., IMEI, MEID, eMMC ID, eSIM ID, electronic device ID, CP ID, or AP ID) on the electronic device 1010 to the server 1020. When identifying information on the network, the electronic device 1010 may also further transmit the information on the network.

According to an embodiment, in operation 1050, the server 1020 may generate data and a signature necessary for the release of the network lock function of the electronic device 1010. For example, the server 1020 may generate the signature by using at least one of SIM lock data, the information on the electronic device 1010, or the information on the network.

According to an embodiment, in operation 1060, the server 1020 may transmit, to the electronic device 1010, the generated data and signature necessary for the release of the network lock function.

According to an embodiment, in operation 1070, the electronic device 1010 may identify whether the received signature is valid.

According to an embodiment, when the signature of the received server 1020 is valid, in operation 1080, the electronic device 1010 may release the network lock function by using the received data necessary for the release of the network lock function. When the network lock function is released, the electronic device 1010 may perform communication by using a network of another network service provider in addition to the previously set-up network service provider.

According to an embodiment, when the signature of the server 1020 is not valid, the electronic device 1010 may not release the network lock function. For example, the electronic device 1010 may not perform the operation for releasing the network lock function. When the network lock function is not released, the electronic device 1010 may still continue to perform communication by using only the pre-configured network.

An electronic device according to an embodiment of the disclosure may include a communication module, a subscriber identification module, and at least one processor. The at least one processor may identify whether the subscriber identification module is first inserted, may identify identification information of the subscriber identification module stored in the subscriber identification module when the subscriber identification module is identified as being first inserted, may configure a network service provider based on the identified identification information, may generate a signature by using lock information of the subscriber identification module, may identify whether the signature is valid, may identify network lock information when the signature is identified as being valid, and may set up a network lock function of the communication module based on the identified network lock information.

In the electronic device according to an embodiment of the disclosure, the at least one processor may include a first processor and a second processor. The first processor may identify whether the subscriber identification module has been first inserted, may identify the identification information of the subscriber identification module stored in the subscriber identification module when the subscriber identification module is identified as being first inserted, may configure the network service provider based on the identified identification information, and may generate the signature by using the lock information of the subscriber identification module and deliver the signature to the second processor. The second processor may identify whether the signature delivered by the first processor is valid, may identify the network lock information when the signature is identified as being valid, and may set up the network lock function based on the identified network lock information.

The at least one processor of the electronic device according to an embodiment of the disclosure may configure the network service provider using information on a country to which a subscriber of the electronic device belongs and information on a subscriber network service provider of the electronic device which are included in the identification information of the subscriber identification module.

In the electronic device according to an embodiment of the disclosure, the network lock information may include at least one of a temporary network lock password, a network control key (NCK), a master control key (MCK), a network subset code key (NSCK), a service provider control key (SPCK), a subscriber identity module (SIM)/USIM lock (SIMCK), a corporate lock key (CPCK) network lock, activation/deactivation information of the network lock, set-up information for types of network lock or lock of subscriber identification information, a permission mobile country code (MCC)/mobile network code (MNC) list of service provider subscriber identification information, or a black MCC/MNC list.

The electronic device according to an embodiment of the disclosure may further include a memory. The at least one processor may identify the subscriber identification module as being first inserted, based on information on the network service provider being not stored in the memory.

An electronic device according to an embodiment of the disclosure may include a communication module, a subscriber identification module, and at least one processor. The at least one processor may identify whether the subscriber identification module is first inserted, may identify identification information of the subscriber identification module stored in the subscriber identification module when the subscriber identification module is identified as being first inserted, may transmit, to a server, the identification information of the subscriber identification module and identification information of the electronic device, may receive network service provider information, a signature, and network lock information from the server, may identify whether the signature is valid, may identify the network lock information when the signature is identified as being valid, and may set up a network lock function of the communication module based on the identified network lock information.

In the electronic device according to an embodiment of the disclosure, the at least one processor may include a first processor and a second processor. The first processor may identify whether the subscriber identification module is first inserted, and may deliver the identification information of the electronic device to the second processor when the subscriber identification module is identified as being first inserted. The second processor may identify the identification information of the subscriber identification module stored in the subscriber identification module, may transmit the identification information of the subscriber identification module and the identification information of the electronic device to the server, may receive the network service provider information, the signature, and the network lock information from the server, may identify whether the signature is valid, may identify the network lock information when the signature is identified as being valid, and may set up the network lock function of the communication module based on the identified network lock information.

In the electronic device according to an embodiment of the disclosure, the network lock information may include at least one of a temporary network lock password, a network control key (NCK), a master control key (MCK), a network subset code key (NSCK), a service provider control key (SPCK), a subscriber identity module (SIM)/USIM lock (SIMCK), a corporate lock key (CPCK) network lock, activation/deactivation information of the network lock, set-up information for types of network lock or lock of subscriber identification information, a permission mobile country code (MCC)/mobile network code (MNC) list of service provider subscriber identification information, or a black MCC/MNC list.

The electronic device according to an embodiment of the disclosure may further include a memory. The at least one processor may identify the subscriber identification module as being first inserted, based on an ID of the network service provider being not stored in the memory.

In the electronic device according to an embodiment of the disclosure, the identification information of the electronic device may include at least one of an international mobile equipment identity (IMEI), a mobile equipment identifier (MEID), an embedded multimedia card identifier (eMMC ID), an embedded SIM (eSIM) ID, an identifier (ID) of the electronic device, a communication processor identifier (CP ID), or an application processor identifier (AP ID).

An operating method of an electronic device according to an embodiment of the disclosure may include identifying whether a subscriber identification module is first inserted, identifying identification information of the subscriber identification module stored in the subscriber identification module when the subscriber identification module is identified as being first inserted, configuring a network service provider based on the identified information, generating a signature by using lock information of the subscriber identification module, identifying whether the signature is valid, identifying network lock information when the signature is identified as being valid, and setting up a network lock function based on the identified network lock information.

In the operating method of the electronic device according to an embodiment of the disclosure, identifying whether a subscriber identification module is first inserted, identifying identification information of the subscriber identification module stored in the subscriber identification module, configuring the network service provider, and generating the signature may be performed by a first processor. Identifying whether the signature is valid, identifying the network lock information when the signature is identified as being valid, and setting up the network lock function based on the identified network lock information may be performed by the second processor.

In the operating method of the electronic device according to an embodiment of the disclosure, configuring the network service provider may include configuring the network service provider using information on a country to which a subscriber of the electronic device belongs and information on a subscriber network service provider of the electronic device which are included in the identification information of the subscriber identification module.

In the operating method of the electronic device according to an embodiment of the disclosure, wherein the network lock information may include at least one of a temporary network lock password, a network control key (NCK), a master control key (MCK), a network subset code key (NSCK), a service provider control key (SPCK), a subscriber identity module (SIM)/USIM lock (SIMCK), a corporate lock key (CPCK) network lock, activation/deactivation information of the network lock, set-up information for types of network lock or lock of subscriber identification information, a permission mobile country code (MCC)/mobile network code (MNC) list of service provider subscriber identification information, or a black MCC/MNC list.

In the operating method of the electronic device according to an embodiment of the disclosure, identifying whether the subscriber identification module is first inserted may include identifying that the subscriber identification module has been first inserted based on information on the network service provider being not stored in a memory.

An operating method of an electronic device according to an embodiment of the disclosure may include identifying whether a subscriber identification module is first inserted, identifying identification information of the subscriber identification module stored in the subscriber identification module when the subscriber identification module is identified as being first inserted, transmitting the identification information of the subscriber identification module and identification information of the electronic device to a server, receiving network service provider information, a signature, and network lock information from the server, identifying whether the signature is valid, identifying the network lock information when the signature is identified as being valid, and setting up a network lock function of the communication module based on the identified network lock information.

In the operating method of the electronic device according to an embodiment of the disclosure, identifying whether a subscriber identification module is first inserted and transmitting identification information of the electronic device to a second processor when the subscriber identification module is identified as being first inserted may be performed by a first processor. Identifying identification information of the subscriber identification module stored in the subscriber identification module, transmitting the identification information of the subscriber identification module and identification information of the electronic device to the server, receiving network service provider information, the signature, and network lock information from the server, identifying whether the signature is valid, identifying the network lock information when the signature is identified as being valid, and setting up the network lock function of the communication module based on the identified network lock information may be performed by the second processor.

In the operating method of the electronic device according to an embodiment of the disclosure, the network lock information may include at least one of a temporary network lock password, a network control key (NCK), a master control key (MCK), a network subset code key (NSCK), a service provider control key (SPCK), a subscriber identity module (SIM)/USIM lock (SIMCK), a corporate lock key (CPCK) network lock, activation/deactivation information of the network lock, set-up information for types of network lock or lock of subscriber identification information, a permission mobile country code (MCC)/mobile network code (MNC) list of service provider subscriber identification information, or a black MCC/MNC list.

In the operating method of the electronic device according to an embodiment of the disclosure, identifying whether the subscriber identification module has been first inserted may include identifying the subscriber identification module as being identified as being first inserted, based on an ID of the network service provider being not stored in a memory.

In the operating method of the electronic device according to an embodiment of the disclosure, the identification information of the electronic device may include at least one of an international mobile equipment identity (IMEI), a mobile equipment identifier (MEID), an embedded multimedia card identifier (eMMC ID), an embedded SIM (eSIM) ID, an identifier (ID) of the electronic device, a communication processor identifier (CP ID), or an application processor identifier (AP ID).

According to certain embodiments of the disclosure, an electronic device may receive, through a server, at least some information related to a network service provider. The server may store information about the electronic device and/or information about the network service provider. The electronic device may receive, from the server, network service provider information of the electronic device, may configure a network lock function, and may manage a network lock state.

For example, if a network lock of the electronic device has not been set up (i.e., when the network is unlocked) upon identifying a server when the electronic device is first opened or its SIM is first recognized, the electronic device may use any network service provider. Furthermore, for example, if a network lock has been configured as a specific network service provider upon identifying a server when an electronic device is first opened, the network lock function of the electronic device may be set up based on network lock information of the specific network service provider.

According to certain embodiments of the disclosure, the network lock function of the electronic device may be configured based on SIM information or information of a server by using a piece of software. If the network lock function is set up by using a piece of software, a network service provider or a user can directly and easily set up the network lock function. Accordingly, the network service provider and/or a manufacturer of an electronic device can efficiently perform inventory management or supply network management.

According to certain embodiments of the disclosure, the manufacturer of the electronic device and a network service provider can easily perform supply network management.

According to certain embodiments of the disclosure, an electronic device can configure a network lock function thereof by using a piece of software.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a communication module;
a subscriber identification module; and
at least one processor,
wherein the at least one processor is configured to:
identify whether the subscriber identification module is first inserted,
identify identification information of the subscriber identification module stored in the subscriber identification module when the subscriber identification module is identified as being first inserted,
configure a network service provider based on the identified identification information,
generate a signature by using lock information of the subscriber identification module,
identify whether the signature is valid,
identify network lock information when the signature is identified as being valid, and
set up a network lock function of the communication module based on the identified network lock information.

2. The electronic device of claim 1, wherein:
the at least one processor comprises a first processor and a second processor, and
the first processor is configured to:
identify whether the subscriber identification module is first inserted,
identify the identification information of the subscriber identification module stored in the subscriber identification module when the subscriber identification module is identified as being first inserted,
configure the network service provider based on the identified identification information, and
generate the signature by using the lock information of the subscriber identification module and deliver the signature to the second processor, and
the second processor is configured to:
identify whether the signature delivered by the first processor is valid,
identify the network lock information when the signature is identified as being valid, and
set up the network lock function based on the identified network lock information.

3. The electronic device of claim 1, wherein the at least one processor is configured to configure the network service provider using information on a country to which a subscriber of the electronic device belongs and information on a subscriber network service provider of the electronic device which are included in the identification information of the subscriber identification module.

4. The electronic device of claim 1, wherein the network lock information comprises a temporary network lock password, a network control key (NCK), a master control key (MCK), a network subset code key (NSCK), a service provider control key (SPCK), a subscriber identity module (SIM)/USIM lock (SIMCK), a corporate lock key (CPCK) network lock, activation/deactivation information of the network lock, set-up information for types of network lock or lock of subscriber identification information, a permission mobile country code (MCC)/mobile network code (MNC) list of service provider subscriber identification information, and/or a black MCC/MNC list.

5. The electronic device of claim 1, further comprising a memory,
wherein the at least one processor is configured to identify the subscriber identification module as being first inserted, based on information on the network service provider being not stored in the memory.

6. The electronic device of claim 1, wherein the at least one processor is configured to:
transmit, to a server, the identification information of the subscriber identification module and identification information of the electronic device, and
receive network service provider information, a signature, and network lock information from the server.

7. The electronic device of claim 6, wherein:
the at least one processor comprises a first processor and a second processor,
the first processor is configured to:
identify whether the subscriber identification module is first inserted, and deliver the identification information of the electronic device to the second processor when the subscriber identification module is identified as being first inserted, and the second processor is configured to:
identify the identification information of the subscriber identification module stored in the subscriber identification module,
transmit the identification information of the subscriber identification module and the identification information of the electronic device to the server,
receive the network service provider information, the signature, and the network lock information from the server,
identify whether the signature is valid,
identify the network lock information when the signature is identified as being valid, and
set up the network lock function of the communication module based on the identified network lock information.

8. The electronic device of claim 6, wherein the identification information of the electronic device comprises an international mobile equipment identity (IMEI), a mobile equipment identifier (MEID), an embedded multimedia card identifier (eMMC ID), an embedded SIM (eSIM) ID, an identifier (ID) of the electronic device, a communication processor identifier (CP ID), and/or an application processor identifier (AP ID).

9. An operating method of an electronic device, comprising:
identifying whether a subscriber identification module is first inserted;
identifying identification information of the subscriber identification module stored in the subscriber identification module when the subscriber identification module is identified as being first inserted;
configuring a network service provider based on the identified information;
generating a signature by using lock information of the subscriber identification module;
identifying whether the signature is valid;
identifying network lock information when the signature is identified as being valid; and
setting up a network lock function based on the identified network lock information.

10. The operating method of claim 9, wherein:
identifying whether the subscriber identification module is first inserted, identifying the identification information of the subscriber identification module stored in the subscriber identification module, configuring the network service provider, and generating the signature are performed by a first processor, and
identifying whether the signature is valid, identifying the network lock information when the signature is identified as being valid, and setting up the network lock function based on the identified network lock information are performed by a second processor.

11. The operating method of claim 9, wherein configuring the network service provider further comprises configuring the network service provider using information on a country to which a subscriber of the electronic device belongs and information on a subscriber network service provider of the electronic device which are included in the identification information of the subscriber identification module.

12. The operating method of claim 9, wherein the network lock information comprises a temporary network lock password, a network control key (NCK), a master control key (MCK), a network subset code key (NSCK), a service provider control key (SPCK), a subscriber identity module (SIM)/USIM lock (SIMCK), a corporate lock key (CPCK) network lock, activation/deactivation information of the network lock, set-up information for types of network lock or lock of subscriber identification information, a permission mobile country code (MCC)/mobile network code (MNC) list of service provider subscriber identification information, and/or a black MCC/MNC list.

13. The operating method of claim 9, wherein identifying whether a subscriber identification module is first inserted further comprises identifying the subscriber identification module as being first inserted, based on information on the network service provider being not stored in a memory.

14. The operating method of claim 9, wherein configuring the network service provider further comprises:
transmitting the identification information of the subscriber identification module and identification information of the electronic device to the server; and
receiving the network service provider information, the signature, and the network lock information from the server.

15. The operating method of claim 14, wherein:
identifying whether the subscriber identification module is first inserted and transmitting identification information of the electronic device to a second processor based on the subscriber identification module being identified as being first inserted are performed by a first processor, and
identifying identification information of the subscriber identification module stored in the subscriber identification module, transmitting the identification information of the subscriber identification module and identification information of the electronic device to a server, receiving network service provider information, a signature, and network lock information from the server, identifying whether the signature is valid, identifying the network lock information based on the signature being identified as being valid, and setting up a network lock function of the communication module based on the identified network lock information are performed by the second processor.

16. The operating method of claim 14, wherein the identification information of the electronic device comprises at least one of an international mobile equipment identity (IMEI), a mobile equipment identifier (MEID), an embedded multimedia card identifier (eMMC ID), an embedded SIM (eSIM) ID, an identifier (ID) of the electronic device, a communication processor identifier (CP ID), and/or an application processor identifier (AP ID).

* * * * *